United States Patent
Kawamoto et al.

(10) Patent No.: US 10,562,194 B2
(45) Date of Patent: Feb. 18, 2020

(54) HOLDING NOZZLE, HOLDING HEAD AND TRANSPORTATION APPARATUS

(71) Applicant: Hirata Corporation, Kumamoto (JP)

(72) Inventors: Yukihiro Kawamoto, Kumamoto (JP); Satoshi Sugaya, Kumamoto (JP)

(73) Assignee: HIRATA CORPORATION, Kumamoto-Shi, Kumamoto (JP)

( * ) Notice: Subject to any disclaimer, the term of this patent is extended or adjusted under 35 U.S.C. 154(b) by 0 days.

(21) Appl. No.: 16/107,261

(22) Filed: Aug. 21, 2018

(65) Prior Publication Data

US 2019/0061175 A1    Feb. 28, 2019

(30) Foreign Application Priority Data

Aug. 30, 2017   (JP) ................................ 2017-165887

(51) Int. Cl.
    *B25J 15/06*      (2006.01)
    *B25J 15/00*      (2006.01)
    (Continued)

(52) U.S. Cl.
    CPC ....... *B25J 15/0683* (2013.01); *B25J 15/0052* (2013.01); *B65G 47/917* (2013.01);
    (Continued)

(58) Field of Classification Search
CPC . B25J 15/0683; B25J 15/0052; B65G 49/061; B65G 47/918; B65G 47/917; B65G 2249/045; B65G 2201/02
See application file for complete search history.

(56) References Cited

U.S. PATENT DOCUMENTS 3,602,543 A     8/1971   Sjodin
3,702,698 A * 11/1972   Schwebel ............ B65H 3/0883
                                                               271/103

(Continued)

FOREIGN PATENT DOCUMENTS

EP          2463065 A1    6/2012
JP          63-136636 U    9/1988
(Continued)

OTHER PUBLICATIONS

Office Action (Notice of Reasons for Rejection) dated May 10, 2019 in corresponding Japanese Patent Application No. 2017-165887, and an English translation thereof.

*Primary Examiner* — Stephen A Vu
(74) *Attorney, Agent, or Firm* — Buchanan Ingersoll & Rooney PC

(57) ABSTRACT

A holding nozzle is provided with a suction member including a suction portion which comes into contact with a panel and a shaft portion communicated with the suction portion, an accommodation portion in which the shaft portion is accommodated, a suction member support portion supporting the shaft portion such that the suction member is movable with respect to the accommodation portion, a negative pressure connection portion to which a negative pressure generator is connected, and a communication member accommodated in the accommodation portion between the negative pressure connection portion and the suction member support portion and has a hollow portion which is a portion of a flow path through which a fluid is flowed. The communication member includes a first connection portion connected to the negative pressure connection portion, a second connection portion connected to the shaft portion, and a contractible portion installed between the first and second connection portions.

13 Claims, 13 Drawing Sheets

(51) Int. Cl.
*B65G 49/06* (2006.01)
*B65G 47/91* (2006.01)

(52) U.S. Cl.
CPC ......... *B65G 47/918* (2013.01); *B65G 49/061* (2013.01); *B65G 2201/02* (2013.01); *B65G 2249/045* (2013.01)

(56) References Cited

U.S. PATENT DOCUMENTS

| | | | |
|---|---|---|---|
| 4,763,941 A | | 8/1988 | Sniderman |
| 4,950,011 A * | | 8/1990 | Borcea ............... H05K 13/0413 |
| | | | 294/2 |
| 5,076,564 A * | | 12/1991 | Marass ................ B65H 3/0891 |
| | | | 271/108 |
| 6,612,633 B1 | | 9/2003 | Tell |
| 6,622,902 B2 | | 9/2003 | Kim |
| 6,663,092 B2 * | | 12/2003 | Kashiwazaki ........ B25B 11/007 |
| | | | 269/21 |
| 7,222,901 B2 * | | 5/2007 | Gebauer ................ B65G 47/91 |
| | | | 294/183 |
| 2011/0001024 A1 | | 1/2011 | Cho |
| 2012/0025053 A1 | | 2/2012 | Tell |
| 2012/0285015 A1 * | | 11/2012 | Shiga .................... B23P 19/045 |
| | | | 29/888.46 |
| 2016/0318192 A1 | | 11/2016 | Eisele et al. |
| 2017/0291308 A1 | | 10/2017 | Yamamuro |

FOREIGN PATENT DOCUMENTS

| | | |
|---|---|---|
| JP | 5-72386 U | 10/1993 |
| JP | 2001-260065 A | 9/2001 |
| JP | 2002-233982 A | 8/2002 |
| JP | 2006-137000 A | 6/2006 |
| JP | 3943481 B2 | 11/2007 |
| JP | 2011-513669 A | 4/2011 |
| JP | 2012-046338 A | 3/2012 |
| JP | 2013-154968 A | 8/2013 |
| WO | 2016/056115 A1 | 4/2016 |

* cited by examiner

HOLDING NOZZLE, HOLDING HEAD AND TRANSPORTATION APPARATUS

BACKGROUND OF THE INVENTION

Field of the Invention

Priority is claimed on Japanese Patent Application No. 2017-165887, filed on Aug. 30, 2017, the content of which is incorporated herein by reference.

The present invention relates to a holding nozzle for holding a workpiece with suction of air, a holding head including the holding nozzle, and a transportation apparatus for transporting the workpiece held by the holding nozzle.

Description of Related Art

Conventionally, a workpiece such as a display panel assembly is moved using a holding nozzle with suction of air. Specifically, a suctioning disk-shaped suction pad that is an elastic member is pressed onto a flat portion of the workpiece to suck, the workpiece is held with suction by the suction pad, and then the workpiece is delivered from a supply section to a destination section.

For example, Japanese Patent No. 3943481B2 discloses a holding nozzle including a suction pad portion, a bellows portion which is formed continuously with the suction pad portion, and an attachment portion which is formed continuously with the bellows portion. In addition, JP 3943481B2 discloses a transportation apparatus including a rod on which the holding nozzle is mounted and a holding head having a cylinder portion which causes the rod to be slidable by a fluid pressure. In the transportation apparatus, the holding head is moved to a supply portion, and the workpiece supplied to the supply portion is held by the holding nozzle. Then the workpiece is moved from the supply portion by the holding head, and is delivered to the destination section.

A work object of the transportation apparatus of JP 3943481B2 is an electronic component including a plate-shaped substrate portion on which an electronic circuit is formed and a flexible film-shaped wiring portion connected to the substrate portion. In order to hold such a workpiece having two portions with different properties as described above, the transportation apparatus of JP 3943481B2 includes a conveyance head provided with a suction holding portion having the suctioning disk-shaped suction pad which holds the substrate portion and a protrusion portion which holds the wiring portion while being in planar contact with the wiring portion. The workpiece is transported by the conveyance head while the substrate portion and the wiring portion are held by the conveyance head.

In addition, Japanese Unexamined Patent Application, First Publication No. 2006-137000A discloses a suction head which alleviates an impact applied to a workpiece when the workpiece is held with suction. Specifically, a portion between a main body of the suction head and a movable member including a suction portion is covered with a bellows to form an air chamber therein, a pressure inside the air chamber is controlled to apply an upward tensile force to the movable member, weight of the movable member is relatively reduced, and thus the impact when the workpiece is held by the suction portion is alleviated.

Meanwhile, in a case where a display panel assembly such as a liquid crystal display or an organic EL display is a workpiece and the transportation apparatus described in JP 3943481B2 is adopted so as to move the display panel assembly, the holding nozzle is moved downward, and thus the suction pad is pressed onto a display surface of a panel portion. Accordingly, a downward force which lowers the holding nozzle is applied to the panel portion, and thus a downward load is applied to a portion of the display surface of the panel portion via the suction pad, and distortion occurs in the panel portion, which may adversely affect the quality of the display panel. In addition, in the transportation apparatus of JP 3943481B2, liquid crystals contained in the panel portion of the display panel are brought close to a holding portion due to a negative pressure applied to a space formed between the suction pad and the display panel, and thereby the display panel may be scratched. As a result, quality of the display panel assembly may be reduced.

In addition, in a case where the suction head described in JP 2006-137000A is adopted so as to move the above-described display panel assembly, a control for reducing the weight of the movable member and a control for holding the panel portion are respectively performed independently, and thus it is necessary to form two suction paths of independent systems. As a result, a size of the suction head increases, the weight thereof increases, and thus movement efficiency of the panel may be reduced.

The present invention is made in consideration of the above-described circumstances, and an object thereof is to provide a holding nozzle which is capable of reducing adverse effects such as stress on the panel portion caused by suction and holding while transporting the display panel assembly such as a liquid crystal display or an organic EL display, and prevents the display panel from being scratched by the suction head and thereby preventing the display panel assembly from reducing the quality thereof, a holding head including the holding nozzle, and a transportation apparatus on which the holding nozzle and the holding head are mounted.

SUMMARY OF THE INVENTION

According to a first aspect of the present invention, a holding nozzle for holding a panel with suction, includes: a suction member including a suction portion configured to come into contact with the panel and a cylindrical shaft portion which communicates with the suction portion; a cylindrical accommodation portion in which the shaft portion of the suction member is accommodated; a suction member support portion which is installed on one end of the accommodation portion and configured to support the shaft portion such that the suction member is movable with respect to the accommodation portion; a negative pressure connection portion which is installed on the other end of the accommodation portion and to which a negative pressure generator is connected; and a communication member which is accommodated in the accommodation portion between the negative pressure connection portion and the suction member support portion and having a hollow portion which forms a portion of a first flow path, a fluid to which a negative pressure is applied by the negative pressure generator flowing through the first flow path. The communication member includes a first connection portion which is connected to the negative pressure connection portion, a second connection portion which is connected to the shaft portion, and a contractible portion which is installed between the first and second connection portions.

According to a second aspect of the present invention, a holding head for holding a panel assembly including a panel portion with suction, includes: the holding nozzle as configured above; and a nozzle support member configured to support the holding nozzle. The nozzle support member includes a first nozzle connection portion to which the holding nozzle is connected, and a second flow path which communicates with the first flow path via the first nozzle connection portion and through which the fluid flows.

According to a third aspect of the present invention, a transportation apparatus for holding a panel assembly supplied to a supply section with suction and moving the panel assembly to a destination section, includes: a supply portion which is configured to supply the panel assembly to a predetermined position; the above mentioned holding head which is configured to hold the panel assembly supplied to the predetermined position with suction; a movement unit which is configured to move the holding head; and a control unit which is configured to control a holding operation of the panel assembly performed by the holding head and a movement operation of the holding head performed by the movement unit.

According to the present invention, the suction member including the suction portion is supported by the suction member support portion to be allowed to move with respect to the suction member support portion, and thus when the suction portion is brought into contact with the panel portion, only weight of the suction member including the suction portion is applied to the panel portion, and a downward force lowering the holding nozzle is not applied to the panel portion. That is, a large load is not applied to the panel portion via the suction portion in a direction in which a display surface is recessed, and thus distortion does not occur in the panel portion and there is no adverse effect on quality of the display panel.

DETAILED DESCRIPTION OF THE INVENTION

A holding nozzle, a holding head, and a transportation apparatus according to the present invention will be described below.

First Embodiment

Figure 1:
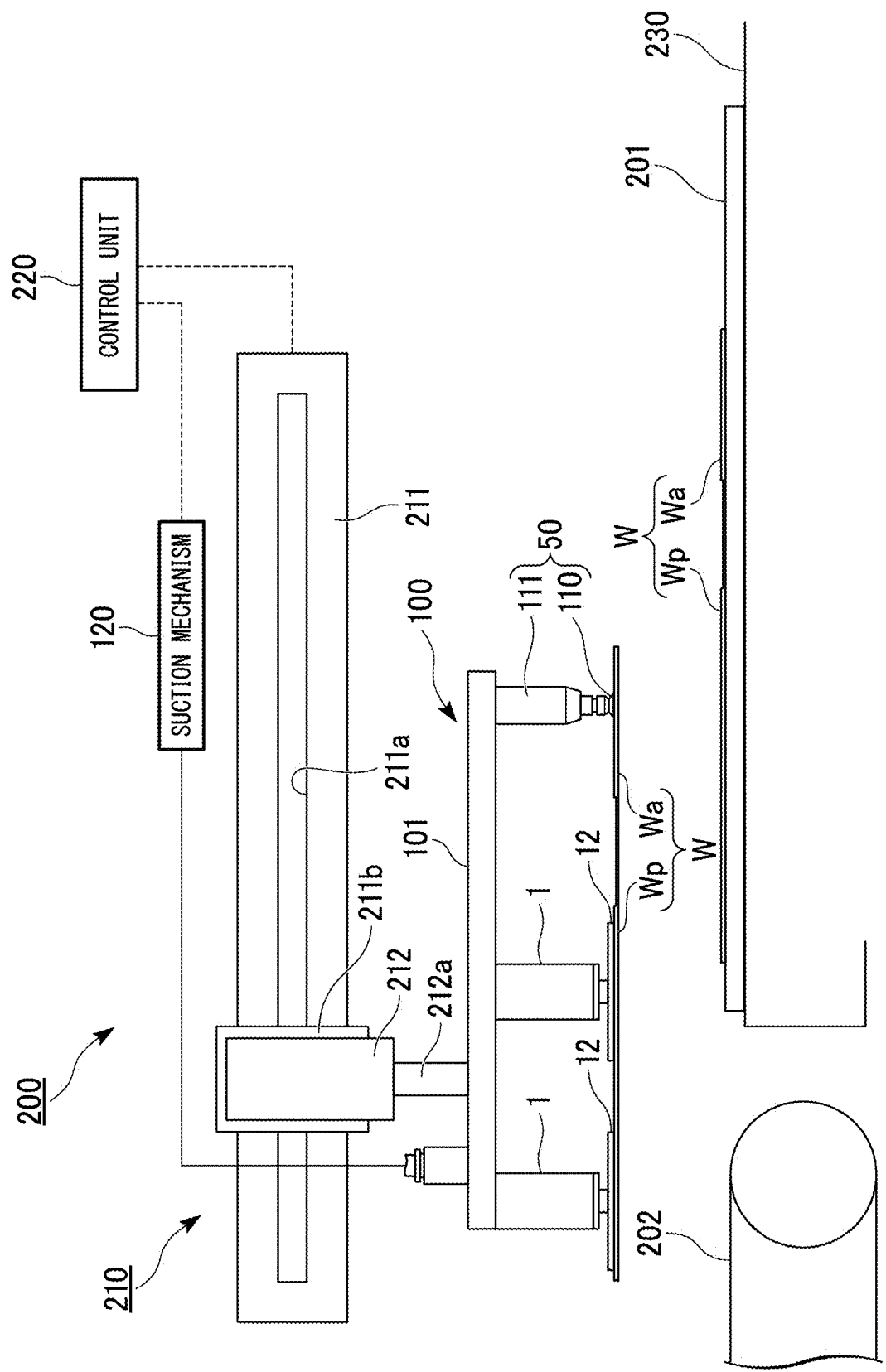
FIG. 1 is a front schematic view of a transportation apparatus 200 including a holding nozzle 1 according to a first embodiment of the present invention.

As shown in FIG. 1, each of holding nozzles 1 as a first embodiment of the present invention is mounted on a nozzle support member 101 of a holding head 100 in a transportation apparatus 200. The transportation apparatus 200 is an apparatus which transports a display panel assembly W such as a liquid crystal display or an organic EL display.

The transportation apparatus 200 includes a supply portion 230 to which a supply tray 201 on which a panel assembly W is placed is supplied, a holding head 100 for holding the panel assembly placed on the supply tray 201 supplied to the supply portion 230 as a supply section, a movement unit 210 for moving the holding head 100 to transfer the panel assembly W held by the holding head 100 to a conveyance unit 202 as a destination section, and a control unit 220 which controls a holding operation of the panel assembly by the holding head 100 and a movement operation of the holding head 100 by the movement unit 210. Here, the display panel assembly W includes a panel portion Wp which becomes a display surface performing a display and a film-shaped accessory portion Wa in which a wire controlling a power source or the display with respect to the panel portion Wp is included.

The movement unit 210 includes a horizontal movement mechanism 211 which horizontally reciprocates the holding head 100 along a placement surface of the supply portion 230 within a range from the supply portion 230 to a belt conveyor 202. The horizontal movement mechanism 211 includes a rail-shaped guide member 211a which extends from the supply portion 230 to the conveyance unit (for example, belt conveyor) 202 and a horizontal driving device 211b which moves the holding head 100 along the guide member 211a, and the horizontal driving device 211b horizontally moves the holding head 100 along the guide member 211a. The guide member 211a is horizontally supported above the supply tray 201 and the belt conveyor 202. The horizontal driving device 211b includes a motor as a power source and a transmission device which transmits an output for the power source to the holding head 100. The transmission device may be selected from a variety of devices, for example, a ball screw, a linear motor, a belt electric motor or the like. A numerically controllable motor (for example, a servo motor) is adopted as the motor which is the power source, and thus a movement and stopping of the holding head 100 are numerically controlled.

In addition, the movement unit 210 includes an elevating mechanism 212 which vertically moves the holding head 100. The elevating mechanism 212 is positioned between the holding head 100 and the horizontal movement mechanism 211 and supports the holding head 100 such that the holding head 100 can be lifted and lowered. The elevating mechanism 212 lifts and lowers the holding head 100 between a position at which suction of the panel assembly W is held or the suction thereof is released and a horizontal movement position at which a horizontal movement of the holding head 100 is allowed. For example, the elevating mechanism 212 is a numerically controllable electric cylinder. The elevating mechanism 212 includes a rod 212a which moves vertically and the holding head 100 is supported by a lower end portion of the rod 212a.

Figure 2:
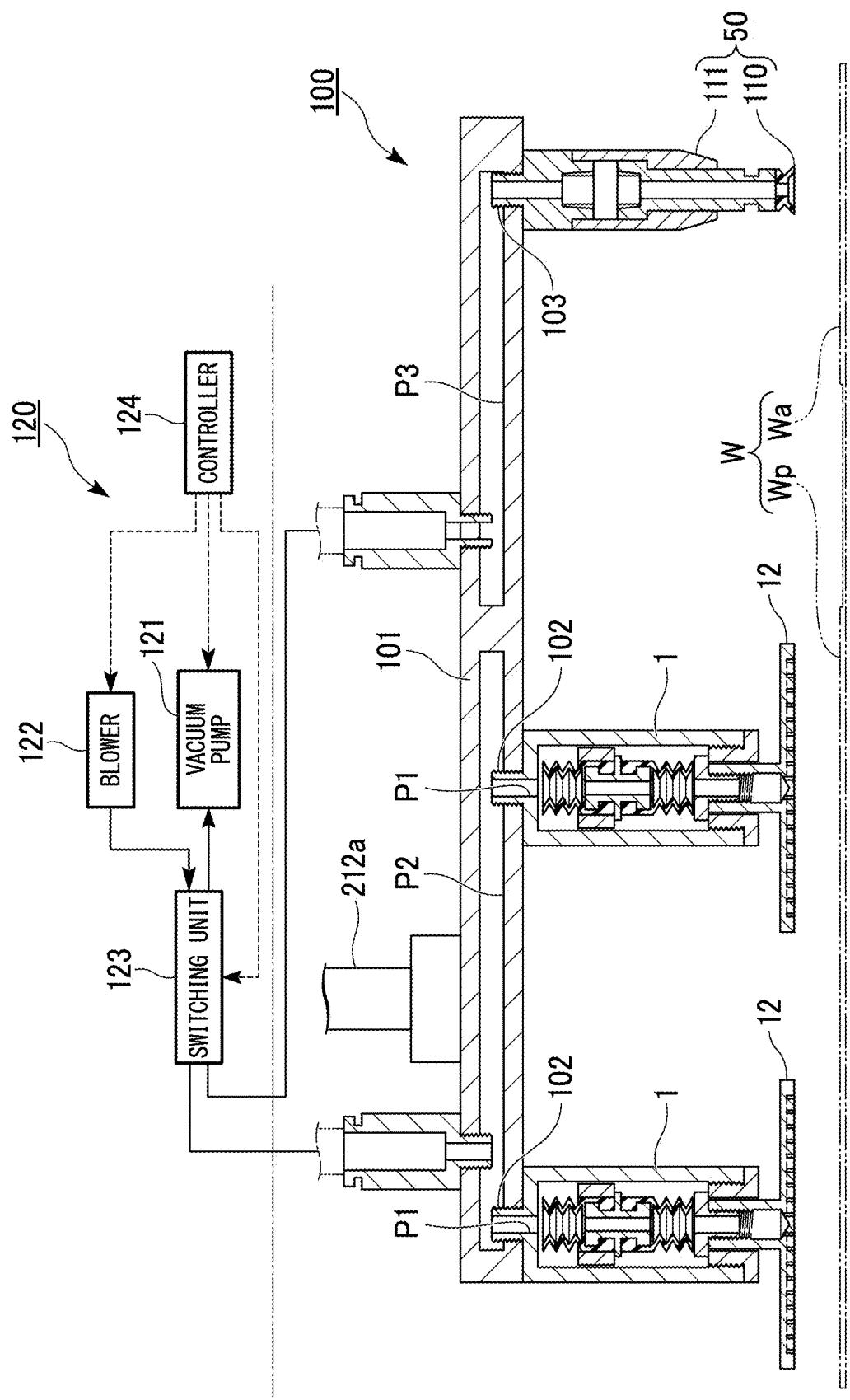
FIG. 2 is an enlarged sectional view of a holding head 100 in FIG. 1.

As shown in FIG. 2, the holding head 100 includes a plurality of holding nozzles 1 and a nozzle support member 101 on which the plurality of holding nozzles 1 are mounted, and is installed on the transportation apparatus 200. The holding head 100 also includes a plurality of accessory portion-holding nozzles 50 for holding the accessory portion Wa included in the panel assembly W. The nozzle support member 101 includes a first connection portion (first nozzle connection portion) 102 to which the holding nozzle 1 is connected and a second connection portion (second nozzle connection portion) 103 to which the accessory portion-holding nozzle 50 is connected. In addition, a second flow path P2 which is communicated with the holding nozzle 1 via the first connection portion 102 and a third flow path P3 which is communicated with the accessory portion-holding nozzle 50 via the second connection portion 103 are formed in the nozzle support member 101. The nozzle support member 101 is a plate-shaped member having a predetermined thickness. In addition, the nozzle support member 101 includes the second flow path P2 and the third flow path P3. Each of the flow paths P2 and P3 may be a flow path which is formed inside the nozzle support member 101, or may be a flow path which is formed by positioning a pipe outside the nozzle support member 101.

Each of the holding nozzles 1 as the first embodiment of the present invention is supported by mounting a negative pressure connection portion 21 on each of the plurality of first connection portions 102 which are installed on the nozzle support member 101 at intervals, and is connected to a suction mechanism 120 through the flow paths P1 and P2. In the present embodiment, two first connection portions 102 are installed on the nozzle support member 101, and one holding nozzle is mounted on each first connection portion 102.

The accessory portion-holding nozzle 50 includes a suction member 110 and a main body 111 which supports the suction member 110 such that the suction member 110 is vertically movable with respect to the main body 111. The suction member 110 is installed on a tip end of the main body 111 and a negative pressure connection portion 112 is formed on a base end of the main body 111. Each accessory portion-holding nozzle 50 is supported by mounting the negative pressure connection portion 112 on each of the plurality of second connection portions 103 which are installed on the nozzle support member 101 at intervals, and is connected to the suction mechanism 120 through the flow paths P2 and P3. In the present embodiment, two second connection portions 103 (only one second connection portion is shown in the FIG. 2) are installed on the nozzle support member 101 to be aligned in a direction intersecting an arrangement direction of the first connection portion 102, and one accessory portion-holding nozzle 50 is mounted on each second connection portion 103.

Figure 3:
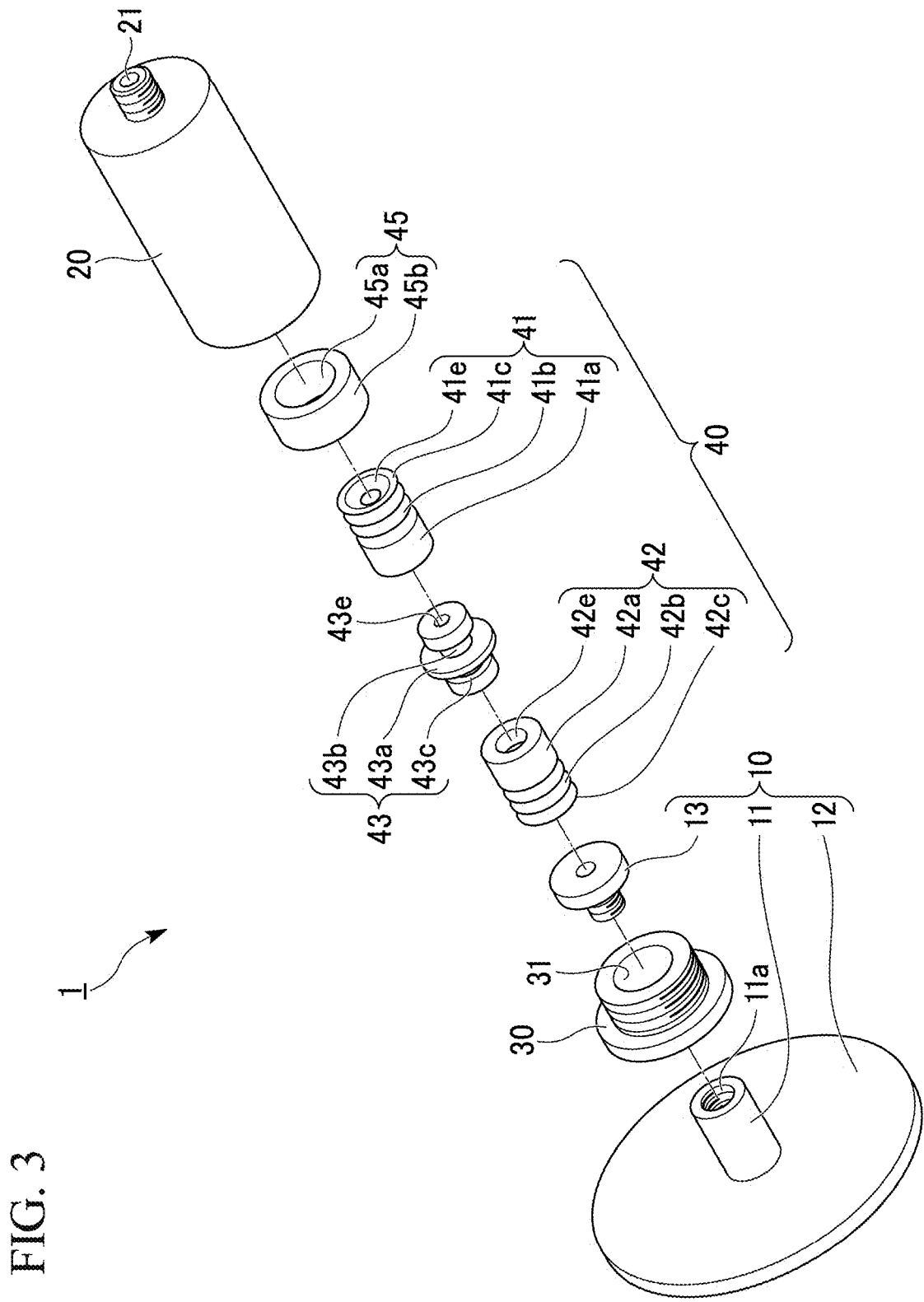
FIG. 3 is an exploded perspective view of the holding nozzle 1 according to the first embodiment of the present invention.
Figure 4:
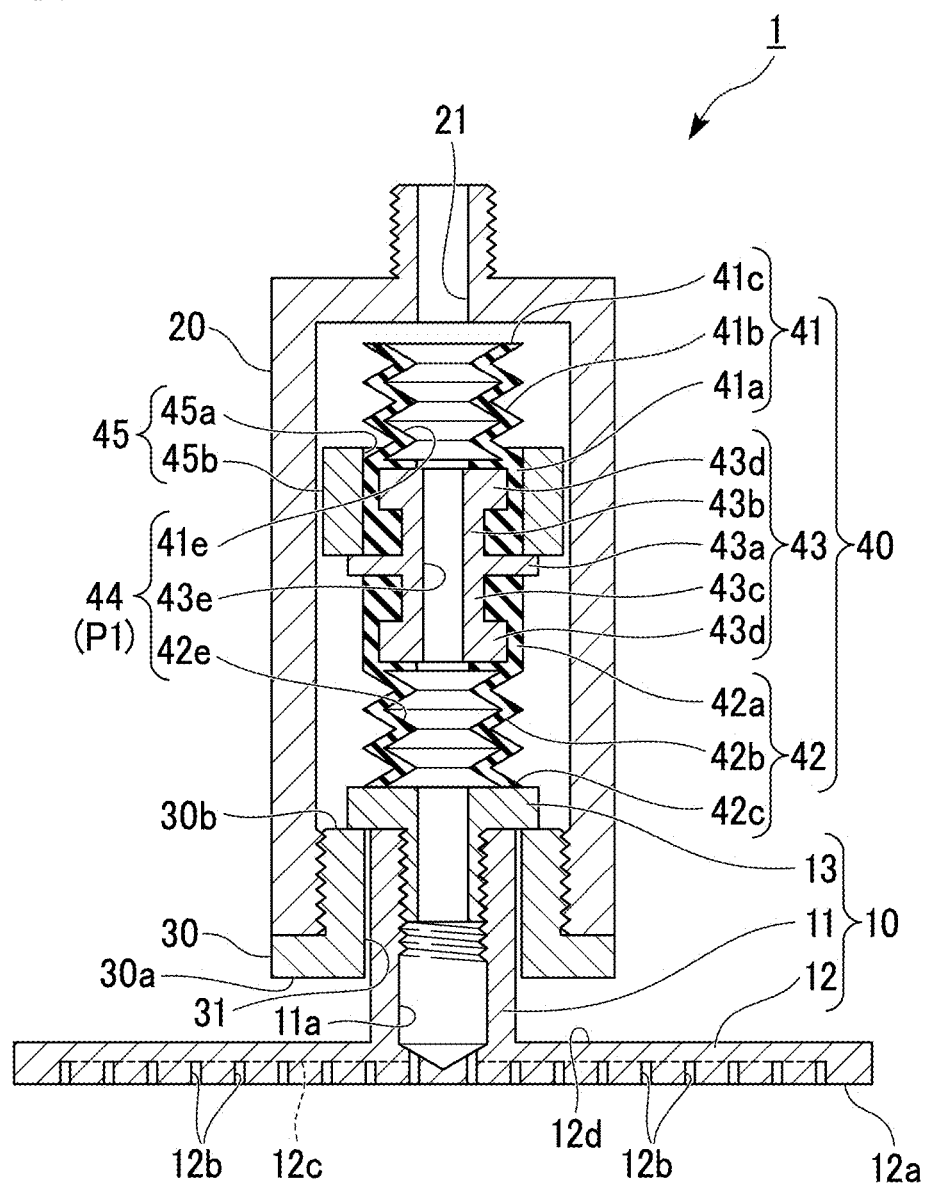
FIG. 4 is an enlarged view of the holding nozzle 1 in FIG. 2.

As shown in FIGS. 3 and 4, the holding nozzle 1 as the first embodiment of the present invention includes a suction member 10, an accommodation portion 20, and a communication member 40, and the holding nozzle 1 is mounted on the holding head 100.

The suction member 10 includes a cylindrical shaft portion 11, a disk-shaped suction portion 12 which is installed on one portion in a longitudinal direction of the shaft portion 11, and a mouthpiece portion 13 which is installed on the other end of the shaft portion 11. A hole 11a is formed at a center of the shaft portion 11 from the mouthpiece portion 13 toward the suction portion 12. In a suction surface of the suction portion 12, that is, in a flat surface portion 12a opposite to a flat surface portion (held restriction portion 12d) on which the shaft portion 11 is formed, a plurality of grooves 12b for suctioning the panel portion Wp are concentrically formed at intervals. In addition, a groove 12c which is communicated with the concentric grooves 12b is radially formed on the flat surface portion 12a. The concentric grooves 12b and the radial groove 12c communicate with the hole 11a of the shaft portion 11. Specifically, the innermost groove 12b communicates with the hole 11a. The groove 12c radially extends to communicate with the innermost groove 12b. Accordingly, all the grooves 12b are connected to each other via the groove 12c. The mouthpiece portion 13 is fastened (for example, screwed) to the other end portion of the shaft portion 11 inserted into a hole 31 described later, and an outer diameter of the mouthpiece portion 13 is formed to be slightly larger than an inner diameter of the hole 31.

The accommodation portion 20 is a cylindrical housing which accommodates the shaft portion 11 of the suction member 10, and the communication member 40 is accommodated in an internal space of the accommodation portion 20. A suction member support portion 30 is installed on one end portion in a longitudinal direction of the accommodation portion 20, and the negative pressure connection portion 21 which is connected to a vacuum pump 121 as a negative pressure generator (refer to FIG. 2) is installed on the other end portion of the accommodation portion 20.

The hole 31 is formed at the center of the suction member support portion 30, the shaft portion 11 is inserted into the hole 31, and the mouthpiece portion 13 is fastened to the other end portion of the shaft portion 11. The suction member support portion 30 supports the shaft portion 11 between the suction portion 12 and the mouthpiece portion 13 such that the suction portion 12 is vertically movable with respect to the accommodation portion 20. In addition, a slight gap is formed between an inner circumferential surface of the hole 31 and an outer circumferential surface of the shaft portion 11. Accordingly, the suction portion 12 can be tilted with respect to the suction member support portion 30 with the mouthpiece portion 13 as a supporting point. The suction member support portion 30 includes a holding restriction portion 30a to which the held restriction portion 12d formed on the suction portion 12 is contacted and an engagement support portion 30b which restricts a movement in an advancement direction of the mouthpiece portion 13.

The communication member 40 is accommodated in the accommodation portion 20 to be positioned between the negative pressure connection portion 21 and the mouthpiece portion 13 of the suction member 10, and includes one elastomeric bellows pad portion (first molded body) 41 in which an inner hole is formed in a longitudinal direction and another bellows pad portion (second molded body) 42 having the same material and shape as those of the bellows pad portion 41, and a metal coupling member 43 which couples the two bellows pad portions 41 and 42 to each other. A hollow portion 44 is formed inside the two bellows pad portions 41 and 42 and the coupling member 43 and constitutes a portion of the first flow path P1 through which a fluid is moved by an operation of the vacuum pump described later.

The one bellows pad portion 41 includes a cylindrical base end portion (first coupling portion) 41a, a bellows-shaped elastically contractible portion 41b which is integrally molded to the base end portion 41a, and a connection portion (first connection portion) 41c which is connected to the negative pressure connection portion 21 on a tip end of the contractible portion 41b. The other bellows pad portion 42 includes a cylindrical base end portion (second coupling portion) 42a, a bellows-shaped elastically deformable contractible portion 42b which is integrally molded to the base end portion 42a, and a connection portion (second connection portion) 42c which is connected to the mouthpiece portion 13 on a tip end of the contractible portion 42b. The coupling member 43 includes a central disk portion 43a, one tubular portion 43b which is formed on one surface of the disk portion 43a, and another tubular portion 43c which is formed on the other surface of the disk portion 43a. The tubular portions 43b and 43c are respectively formed to be continuous in a longitudinal direction in a state where the disk portion 43a is interposed therebetween. In addition, a flange portion 43d is formed in a tip end of each of the tubular portions 43b and 43c to prevent the bellows pad portions 41 and 42 from separating from the coupling member 43.

The base end portion 41a of the bellows pad portion 41 receives the one flange portion 43d inside the base end portion 41a so as to be attached to the one tubular portion 43b of the coupling member 43, and the base end portion 42a of the bellows pad portion 42 receives the other flange portion 43d inside the base end portion 42a so as to be attached to the other tubular portion 43c of the coupling member 43. An inner hole 41e of the bellows pad portion 41 communicates with an inner hole 42e of the bellows pad portion 42 through an inner hole 43e of the coupling member 43, and these series of inner holes form a hollow portion 44 and form the first flow path P1 between the mouthpiece portion 13 and the negative pressure connection portion 21.

In the present embodiment, when the suction portion 12 is positioned at a position separated from the accommodation portion 20 (that is, the suction portion 12 is moved forward with respect to the accommodation portion 20, the mouthpiece portion 13 is positioned at a position separated from the negative pressure connection portion 21, and thus a distance between the mouthpiece portion 13 and the negative pressure connection portion 21 is longer than the length of the communication member 40. Accordingly, the communication member 40 is displaced to the mouthpiece portion 13 side, and the connection portion 42c of the bellows pad portion 42 is brought into contact with the mouthpiece portion 13. In addition, the connection portion 41c of the bellows pad portion 41 is separated from the negative pressure connection portion 21. Meanwhile, when the suction portion 12 is positioned at a position close to the accommodation portion 20 (that is, the suction portion 12 is moved backward with respect to the accommodation portion 20), the mouthpiece portion 13 is positioned at a position close to the negative pressure connection portion 21, and thus the distance between the mouthpiece portion 13 and the negative pressure connection portion 21 is shorter than the length of the communication member 40. Accordingly, if the suction portion 12 is moved rearward, the connection portion 41c of the bellows pad portion 41 comes into close contact with the negative pressure connection portion 21, and the connection portion 42c of the bellows pad portion 42 comes into close contact with the mouthpiece portion 13.

An annular guide member 45 is positioned around the base end portion 41a of the bellows pad portion 41 of the communication member 40. The guide member 45 includes an inner circumferential portion 45a which is capable of contacting with an outer circumference of the bellows pad portion 41 and an outer circumferential portion 45b which is capable of contacting with an inner circumferential surface of the accommodation portion 20. The guide member 45 is put on the disk portion 43a of the coupling member 43 and is positioned upside with respect to the disk portion 43a so as to be surrounding the bellows pad portion 41. The guide member 45 positions the communication member 40 in approximately the center in the accommodation portion 20 such that a central axis extending in the longitudinal direction of the communication member 40 coincides with a central axis extending in the longitudinal direction of the accommodation portion 20, and the guide member 45 guides the communication member 40 in a movable manner in the longitudinal direction. In addition, the length of the guide member 45 in an elastic direction of the communication member 40 is shorter than the length of the communication member 40 even in a case where the communication member 40 contracts, and is short enough not to disturb a contraction operation of the communication member 40. In the present embodiment, since the guide member 45 is restricted by the disk portion 43a of the coupling member 43 such that the guide member 45 is not moved toward the other bellows pad portion 42, the guide member 45 of which the length is shorter than that of the one bellows pad portion 41 in a state where it is contracted should be provided. The communication member 40 is provided with the guide member 45, and thereby a diameter of the communication member 40 can be reduced.

The suction mechanism 120 includes a vacuum pump 121 which applies a negative pressure to the holding nozzles 1 and the accessory portion-holding nozzles 50, a blower 122 which feeds air to the holding nozzles 1 and the accessory portion-holding nozzles 50, a switching unit 123 which selectively connects the vacuum pump 121 or the blower 122 to the holding nozzles 1 and the accessory portion-holding nozzles 50, and a controller 124 which controls the vacuum pump 121, the blower 122, and the switching unit 123.

The vacuum pump 121 suctions air inside the holding nozzles 1 through the flow paths P1 and P2 such that a pressure inside the accommodation portion 20 is less than that of the atmosphere, and thus the panel portion Wp of the panel assembly W is held by the holding nozzles 1 with suction. In addition, air inside the accessory portion-holding nozzles 50 is swept such that a pressure inside the main body 111 is less than that of the atmosphere, and thus the panel portion Wa of the panel assembly W is held by the accessory portion-holding nozzles 50 with suction. The blower 122 feeds air to the holding nozzles 1 through the flow paths P1 and P2 such that the state inside the accommodation portion 20 is a positive pressure state, and thus the panel portion Wp is separated from the holding nozzles 1. In addition, the blower 122 feeds air to the accessory portion-holding nozzles 50 such that the state inside the main body 111 is the positive pressure state, and thus the accessory portion Wa is separated from the accessory portion-holding nozzles 50. The controller 124 selectively operates the vacuum pump 121 and the blower 122 and operates the switching unit 123 so as to connect any one of the vacuum pump 121 and the blower 122 to the holding nozzles 1 and the accessory portion-holding nozzles 50.

The control unit 220 includes the controller 124 which controls a holding operation of the panel assembly W performed by the holding head 100. The control unit 220 controls driving of the horizontal movement mechanism 211 and the elevating mechanism 212 of the movement unit 210 to move the holding head 100 to a portion between the supply tray 201 supplied to the supply portion 230 and the belt conveyor 202 and conveys the panel assembly W including the panel portion Wp and the accessory portion Wa placed on the supply tray 201 in a state where the panel assembly W is held by the holding head 100 to deliver the panel assembly W to the belt conveyor 202.

A process of holding the panel portion Wp using the holding nozzles 1 configured as above will be described with reference to FIGS. 5A, 5B, 6A, and 6B.

Figures 5A, 5B:
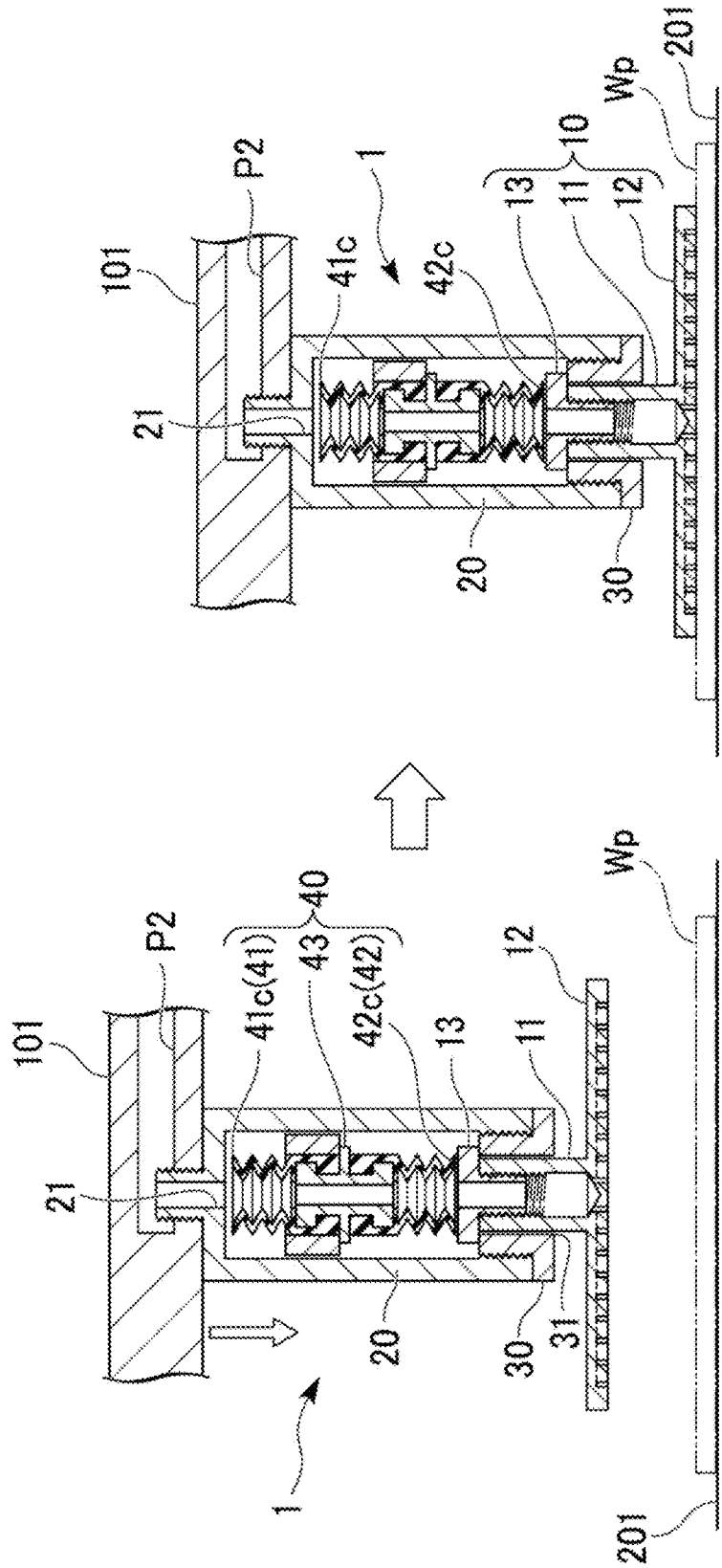
FIGS. 5A and 5B are views showing an operation in which the holding nozzle 1 holds a panel portion Wp with suction in a stepwise manner.

First, each of the holding nozzles 1 is moved to a portion above the supply section on which the panel portion Wp is placed such that the flat surface portion 12a of the suction portion 12 and a suctioned surface of the panel portion Wp face each other to be separated from each other (refer to FIG. 5A). At this time, the suction portion 12 is positioned to be moved forward with respect to the accommodation portion 20 by the weight of the suction portion 12 itself (that is, the suction portion 12 is lowered with respect to the accommodation portion 20), and the connection portion 42c of the bellows pad portion 42 constituting the communication member 40 is brought into contact with the mouthpiece portion 13. Meanwhile, the connection portion 41c of the bellows pad portion 41 is separated from the negative pressure connection portion 21. In this state, even when the negative pressure is applied to the holding nozzle 1 through the flow path P2 of the nozzle support member 101, outside air is suctioned into the holding nozzle 1 through a gap between the connection portion 41c of the bellows pad portion 41 and the negative pressure connection portion 21, the internal space of the accommodation portion 20, and a gap between the hole 31 and the shaft portion 11, and thus the negative pressure is hardly applied to the suction portion 12. In addition, the outside air is suctioned through the gap between the hole 31 and the shaft portion 11, and thus suction of dust generated inside the holding nozzle 1 and dust removal around the nozzle are performed.

From the state of FIG. 5A, the holding nozzle 1 is lowered together with the nozzle support member 101 toward a preset stop position of the holding nozzle 1, and in a process of a lowering operation of the holding nozzle 1, the flat surface portion 12a of the suction portion 12 and the suctioned surface of the panel portion Wp are close to each other to come in to close contact with each other (refer to FIG. 5B). At this time, the suction mechanism 120 is operated together with the lowering operation of the holding nozzle 1, and thus the negative pressure is generated. In the process in which the state is transitioned from the state of FIG. 5A to the state of FIG. 5B, the flat surface portion 12a of the suction portion 12 is brought into contact with the suctioned surface (upward surface) of the panel portion Wp, and a downward force lowering the holding nozzle 1 is applied to the panel portion Wp. However, the suction member 10 including the suction portion 12 is supported by the suction member support portion 30 so as to be allowed to move with respect to the suction member support portion 30, the downward force lowering the holding nozzle 1 is absorbed by the movement of the suction member 10, and thus the downward force is not applied to the panel portion Wp. Only the combined weight of the suction member 10 including the suction portion 12 and the communication member 40 is applied to the panel portion Wp.

Figure 6A:
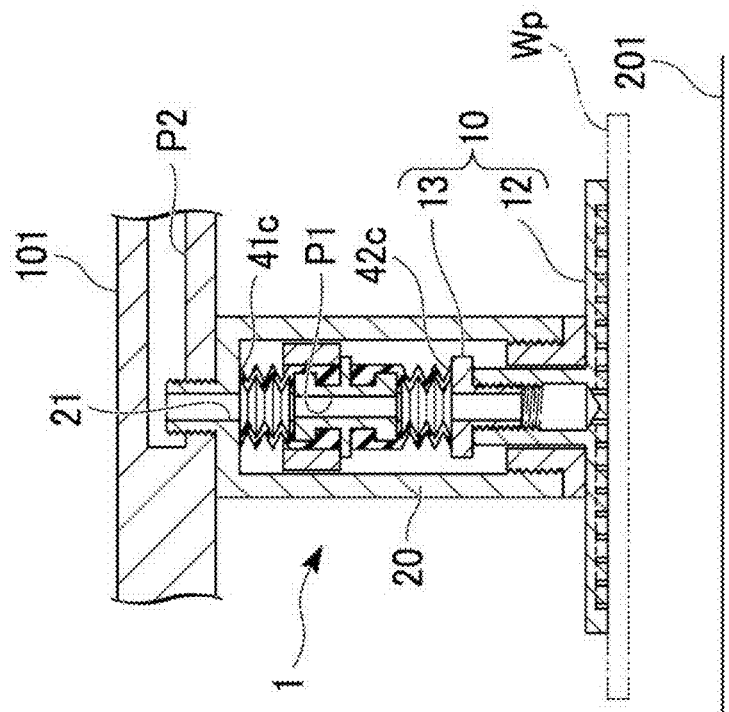
FIGS. 6A and 6B are views showing an operation in which the holding nozzle 1 holds the panel portion Wp with suction in a stepwise manner.
Figure 6B:
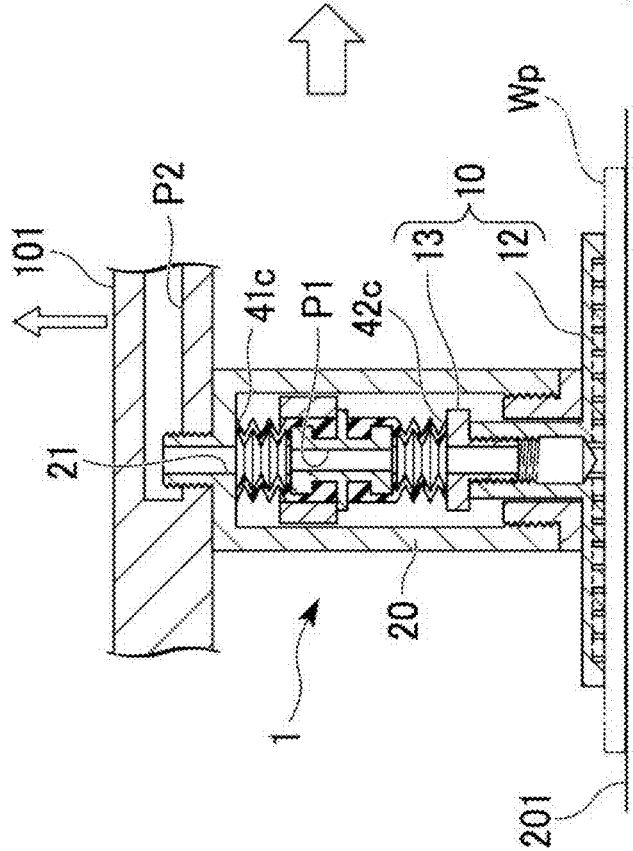

Even after the state of FIG. 5B, that is, even after the suction portion 12 comes into contact with an upper surface of the panel portion Wp, the lowering of the holding nozzle 1 is continued, and thus the holding nozzle 1 is moved to the preset stop position of the holding nozzle 1 (state of FIG. 6A). In a process in which the state is transitioned from the state of FIG. 5B to the state of FIG. 6A, the movement of the suction portion 12 moved downward together with the holding nozzle 1 is restricted by the panel portion Wp. After that, if the holding nozzle 1 and the suction portion 12 are further moved downward, the suction member 10 cannot be moved. However, the nozzle support member 101, the accommodation portion 20, and the suction member support portion 30 are moved downward. Accordingly, the suction member support portion 30 is moved downward along the shaft portion 11 of the suction member 10, substantially the shaft portion 11 and the mouthpiece portion 13 enter the accommodation portion 20. Therefore, a distance between the connection portion 41c of the bellows pad portion 41 and the negative pressure connection portion 21 is reduced, and thus the negative pressure connection portion 21 is brought into contact with the connection portion 41c. If the holding nozzle 1 is further moved downward, the negative pressure connection portion 21 is pressed onto the connection portion 41c of the bellows pad portion 41 and the connection portion 42c of the bellows pad portion 42 is pressed onto the mouthpiece portion 13. As a result, the connection portion 41c and the negative pressure connection portion 21 come into close contact with each other, and the connection portion 42c and the mouthpiece portion 13 come into close contact with each other. Accordingly, the flow path P1 is formed, in which a negative pressure is applied to the suction portion 12 between the mouthpiece portion 13 and the negative pressure connection portion 21 inside the communication member 40.

If the flow path P1 is formed by a suction state of the suction mechanism 120, the panel portion Wp is held by the suction portion 12. The suction portion 12 is movably supported by the suction member support portion 30, and thus the suction portion 12 is tilted depending on the inclination of the panel portion Wp, and the flat surface portion 12a and the panel portion Wp come into close contact with each other to be held with suction. The bellows portions of the bellows pad portions 41 and 42 are contracted due to the action of the negative pressure of the flow path P1, the connection portion 41c and the connection portion 42c are moved (the bellows portions are contracted) in a direction close to each other, and thus the absorbed panel portion Wp is separated from (pulled up from) the placement surface of the supply tray 201. Therefore, it is possible to hold the panel portion Wp and discharge the panel portion Wp from the supply tray 201 without applying an excessive load to the panel portion Wp. In the suction portion 12 which holds the panel portion Wp with suction, the held restriction portion 12d which is the surface opposite to the flat surface portion 12a is brought into contact with the holding restriction portion 30a of the suction member support portion 30 which faces the held restriction portion 12d, and thus the state where the panel portion Wp is held by the suction portion 12 is maintained.

The suction portion 12 holds the panel portion Wp with suction, and the lowering of the holding nozzle 1 is stopped when the holding nozzle 1 reaches a preset discharge stop position. In addition, a position at which a lower end of the suction member support portion 30 is brought into contact with the upper surface (held restriction portion 12d) of the suction portion 12 in the suction member 10 is the discharge stop position. The holding nozzle 1 is further lifted from the state of the FIG. 6A, and thus the state is transitioned to a state (state of FIG. 6B) where the discharge of the panel portion Wp is completed. In a process in which the state is transitioned from the state of FIG. 6A to the state of FIG. 6B, the panel portion Wp suctioned to the suction portion 12 is lifted together with the holding nozzle 1. When the holding nozzle 1 reaches a predetermined height, the lifting of the holding nozzle 1 is stopped, and subsequently, the holding nozzle 1 is horizontally moved toward the destination section together with the panel portion Wp. When the holding nozzle 1 reaches above the destination section, the horizontal movement of the holding nozzle 1 is stopped. Thereafter, the holding nozzle 1 is moved downward, and the panel portion Wp is placed on a placement position of the destination section (in the present embodiment, the belt conveyor 202). At the same time or almost at the same time as the placement of the panel portion Wp, the switching unit 123 is operated, and a connection system with the flow path P1 is switched from the vacuum pump to the blower. Accordingly, the application of the negative pressure is stopped, air blowing is performed, and thus the panel portion Wp is removed from the suction portion 12 and is delivered to the destination section.

According to the holding nozzle 1 configured as described above, when the suction portion 12 is brought into contact with the panel portion Wp, only the combined weight of the suction member 10 including the suction portion 12 and the communication member 40 is applied to the panel portion Wp, and thus the downward force lowering the holding nozzle 1 in the transportation apparatus 200 is not applied to the panel portion Wp. Accordingly, it is possible to prevent a large load from being applied to the panel portion Wp via the suction portion 12 in a direction in which the display surface is recessed. In addition, the suction portion 12 is capable of being freely tilted in the horizontal direction with the mouthpiece portion 13 as a supporting point, and thus when the holding nozzle 1 is lowered and the flat surface portion 12a of the suction portion 12 is brought into contact with the panel portion Wp of the panel assembly W, the suction portion 12 can be inclined according to an inclination of the suctioned surface of the panel portion Wp, and the flat surface portion 12a of the suction portion 12 and the suctioned surface of the panel portion Wp are parallel to each other. Accordingly, the flat surface portion 12a and the panel portion Wp come into uniform contact with each other without being biased to each other. In addition, in the flat surface portion 12a which is in contact with the panel portion Wp of the suction portion 12, the flat surface portion 12a and the panel portion Wp come into uniform contact with each other without being biased to each other, and thus a suction force is distribution between the plurality of grooves 12b and 12c and the suctioned surface of the panel portion Wp. Accordingly, it is possible to prevent a suction trace from being attached to the suctioned surface of the panel portion Wp.

In addition, the bellows-shaped contractible portions 41b and 42b are adjacent to the connection portions 41c and 42c formed on both ends of the communication member 40, and thus if the mouthpiece portion 13 and the negative pressure connection portion 21 approach each other, the connection portion 41c reliably comes into close contact with the negative pressure connection portion 21 and the connection portion 42c reliably comes into close contact with the mouthpiece portion 13 by elastic action of the bellows portions. In addition, the communication member 40 is positioned at approximately the center of the axis in the accommodation portion 20 by the guide member 45. Accordingly, the flow path P1 is reliably formed through the communication member 40 between the mouthpiece portion 13 and the negative pressure connection portion 21. In addition, in the present embodiment, the guide member 45 engages with the communication member 40. However, an outer diameter of the guide member 45 may be made approximately equal to an inner diameter of the accommodation portion 20, an inner diameter of the guide member 45 may be made larger than an outer diameter of the communication member 40 so as to fix the guide member 45 to the accommodation portion 20, and thus the communication member 40 may be moved vertically inside the guide member 45.

Modification Example 1

Figure 7:
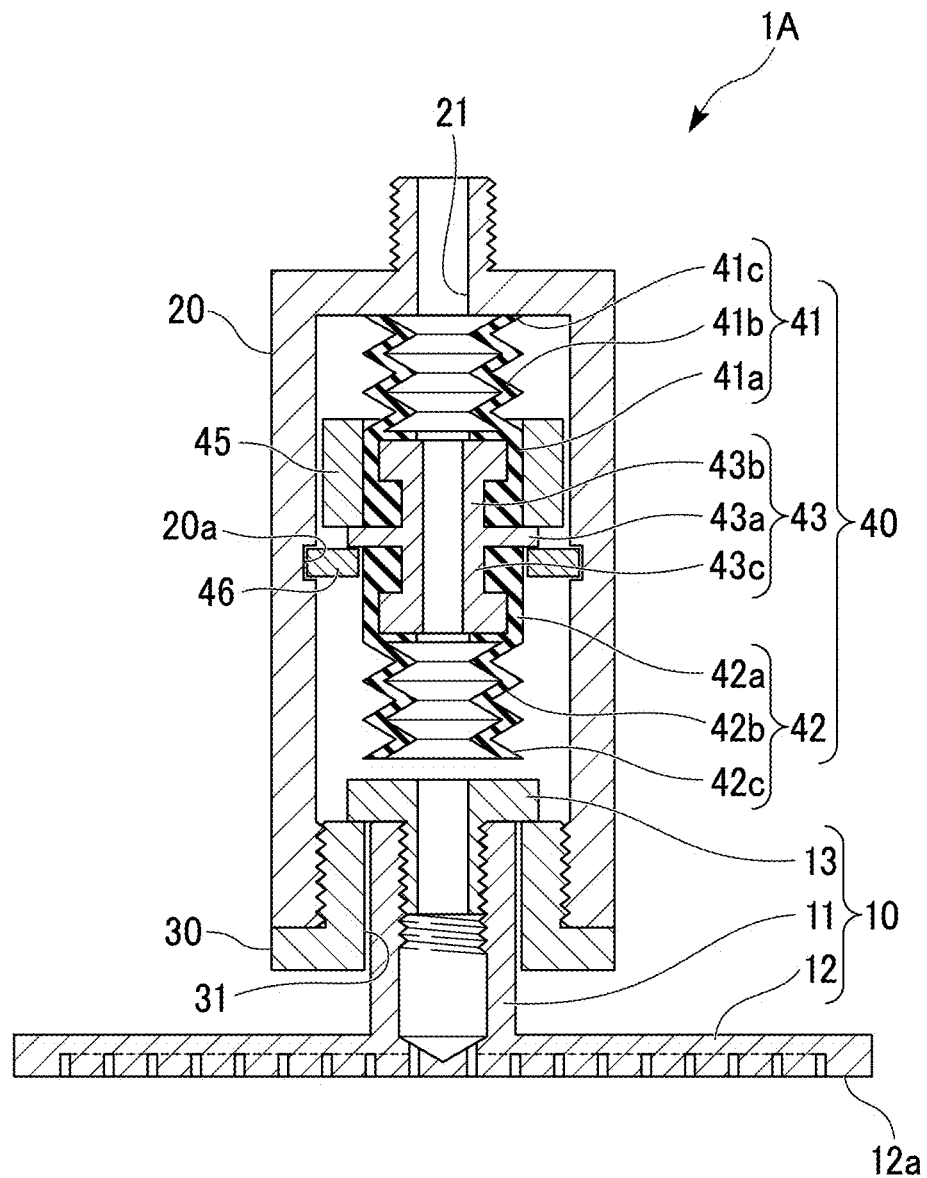
FIG. 7 is a view showing a modification example of the first embodiment and a sectional view in a longitudinal direction of a holding nozzle 1A.

As shown in FIG. 7, in a holding nozzle 1A as a modification example of the first embodiment, a groove portion 20a is formed along an inner circumferential portion of the accommodation portion 20 in the circumferential direction. A holding member 46 is an annular body (for example, a snap ring) of which an outer diameter is larger than an inner diameter of the accommodation portion 20, an outer circumference of the annular body is fitted to the groove portion 20a, and the holding member 46 is mounted at a predetermined position inside the accommodation portion 20. An inner diameter of the holding member 46 is larger than an outer diameter of the base end portion 42a of the bellows pad portion 42 and is smaller than an outer diameter of the disk portion 43a, and by locking the disk portion 43a to the holding member 46, the communication member 40 passing through the inside of the holding member 46 is held at a predetermined position parallel in an axial direction in the accommodation portion 20 in a state where the connection portion 41c of the bellows pad portion 41 is brought into contact with the negative pressure connection portion 21.

In the present modification example, when the suction portion 12 is positioned at a position moved forward with respect to the accommodation portion 20, the mouthpiece portion 13 is positioned to be separated from the negative pressure connection portion 21, and thus the distance between the mouthpiece portion 13 and the negative pressure connection portion 21 is longer than the length of the communication member 40. Accordingly, the connection portion 42c of the bellows pad portion 42 is separated from the mouthpiece portion 13, and thus a gap is generated between the connection portion 42c and the mouthpiece portion 13. Meanwhile, the suction portion 12 is positioned at a position moved backward with respect to the accommodation portion 20, the mouthpiece portion 13 is positioned at a position close to the negative pressure connection portion 21, and thus the distance between the mouthpiece portion 13 and the negative pressure connection portion 21 is shorter than the length of the communication member 40. Accordingly, if the suction portion 12 is moved rearward, the connection portion 42c of the bellows pad portion 42 comes into close contact with the mouthpiece portion 13.

In order to attach the holding nozzle 1A configured as described above to the nozzle support member (101) instead of the holding nozzle 1 and to hold the panel portion Wp by the holding nozzle 1A, first, the holding nozzle 1A is positioned above the supply section on which the panel portion Wp is placed, and thus the flat surface portion 12a of the suction portion 12 and the absorbed surface of the panel portion Wp are separated from each other to face each other. At this time, the suction portion 12 is positioned to be moved forward with respect to the accommodation portion 20 by the weight of the suction portion 12 itself, and the connection portion 42c of the bellows pad portion 42 is separated from the mouthpiece portion 13. In this state, even when the negative pressure is applied to the holding nozzle 1A through the flow path (P2) of the nozzle support member, outside air is suctioned into the holding nozzle 1A through the gap between the connection portion 42c and the mouthpiece portion 13, the internal space of the accommodation portion 20, and the gap between the hole 31 and the shaft portion 11, and thus the negative pressure is hardly applied to the suction portion 12. In addition, the outside air is suctioned through the gap between the hole 31 and the shaft portion 11, and thus the suction of dust generated inside the holding nozzle 1 and the dust removal around the nozzle are performed.

From this state, the holding nozzle 1A is lowered together with the nozzle support member 101 toward a preset stop position of the holding nozzle 1A, and in a process of a lowering operation of the holding nozzle 1A, the flat surface portion 12a of the suction portion 12 and the suctioned surface of the panel portion Wp are close to each other to come in to close contact with each other. At this time, the suction mechanism 120 is operated together with the lowering operation of the holding nozzle 1A, and thus the negative pressure is generated. The suction member 10 including the suction portion 12 is supported by the suction member support portion 30 so as to be allowed to move with respect to the suction member support portion 30, the downward force lowering the holding nozzle 1 is absorbed by the movement of the suction member 10, and thus the downward force is not applied to the panel portion Wp. In addition, in the present modification example, the communication member 40 is held in the accommodation portion 20 by the holding member 46, and thus only the weight of the suction member 10 including the suction portion 12 is applied to the panel portion Wp.

Even after the suction portion 12 comes into contact with an upper surface of the panel portion Wp, if the lowering of the holding nozzle 1A is continued and the holding nozzle 1A is moved to the preset stop position of the holding nozzle 1A, the movement of the suction portion 12 moved downward together with the holding nozzle 1A is restricted by the panel portion Wp. After that, if the holding nozzle 1A and the suction portion 12 are further moved downward, the suction member 10 cannot be moved. However, the nozzle support member 101, the accommodation portion 20, and the suction member support portion 30 are moved downward. Accordingly, the suction member support portion 30 is moved downward along the shaft portion 11 of the suction member 10, substantially the shaft portion 11 and the mouthpiece portion 13 enter the accommodation portion 20. Therefore, a distance between the connection portion 42c of the bellows pad portion 42 and the mouthpiece portion 13 is reduced, and thus the mouthpiece portion 13 is brought into contact with the connection portion 42c. If the holding nozzle 1A is further moved downward, the negative pressure connection portion 21 is pressed onto the connection portion 41c of the bellows pad portion 41 and the connection portion 42c of the bellows pad portion 42 is pressed onto the mouthpiece portion 13. As a result, the connection portion 41c and the negative pressure connection portion 21 come into close contact with each other, and the connection portion 42c and the mouthpiece portion 13 come into close contact with each other. Accordingly, the flow path P1 is formed, in which a negative pressure is applied to the suction portion 12 between the mouthpiece portion 13 and the negative pressure connection portion 21 inside the communication member 40, and thus the panel portion Wp is held by the suction portion 12.

According to the holding nozzle 1A configured as described above, the following effects are exerted in addition to the effects obtained by the first embodiment (holding nozzle 1). That is, one end of the communication member 40 is in contact with the negative pressure connection portion 21, and thus the connection portion 42c is brought into contact with the mouthpiece portion 13 or is separated from the mouthpiece portion 13 according to the displacement of the suction member 10. That is, only the weight of the suction member 10 is applied to the panel portion Wp, and thus stress on the panel portion Wp is further reduced compared with the holding nozzle 1 of the first embodiment, and quality of the panel portion Wp is maintained.

Modification Example 2

Figure 8:
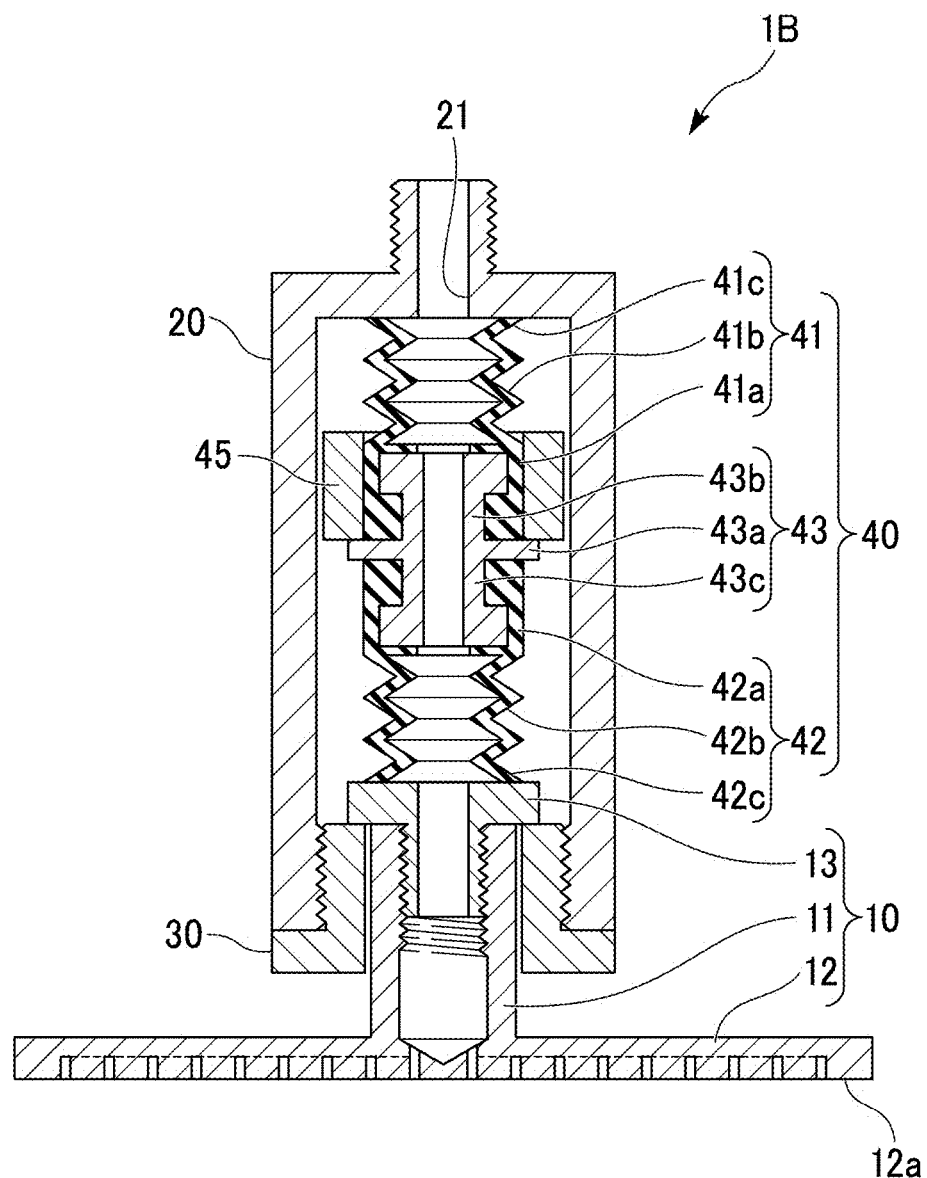
FIG. 8 is a view showing another modification example of the first embodiment and a sectional view in a longitudinal direction of a holding nozzle 1B.

As shown in FIG. 8, in a holding nozzle 1B as a modification example of the first embodiment, the length of the communication member 40 is longer than the distance between the mouthpiece portion 13 and the negative pressure connection portion 21 when the suction portion 12 is moved forward with respect to the accommodation portion 20 and the mouthpiece portion 13 is positioned at the position separated from the negative pressure connection portion 21. Specifically, the communication member 40 is accommodated in the accommodation portion 20 in a state where the contractible portion 41b and the contractible portion 42b are slightly contracted. Accordingly, even when the mouthpiece portion 13 is positioned at the position separated from the negative pressure connection portion 21, the connection portion 41c is brought into contact with the negative pressure connection portion 21 and the connection portion 42c is brought into contact with the mouthpiece portion 13.

In order to attach the holding nozzle 1B configured as described above to the nozzle support member (101) instead of the holding nozzle 1 so as to hold the panel portion Wp with suction, first, the holding nozzle 1B is positioned above the supply section on which the panel portion Wp is placed, and thus the flat surface portion 12a of the suction portion 12 and the absorbed surface of the panel portion Wp are separated from each other to face each other. At this time, the suction portion 12 is moved forward with respect to the accommodation portion 20 and the mouthpiece portion 13 is positioned at the position separated from the negative pressure connection portion 21. However, even in this state, in the holding nozzle 1B, the connection portion 41c is brought into contact with the negative pressure connection portion 21 and the connection portion 42c is brought into contact with the mouthpiece portion 13.

From this state, the holding nozzle 1B is lowered together with the nozzle support member, the suction mechanism 120 is operated, and thus a negative pressure is generated. In this process, the suction portion 12 is brought into contact with the suctioned surface of the panel portion Wp. However, the suction member 10 including the suction portion 12 is supported by the suction member support portion 30 to be allowed to move vertically with respect to the suction member support portion 30. Accordingly, even when a downward force lowering the holding nozzle 1B is applied to the panel portion Wp via the suction member 10, the contractible portion 41b and the contractible portion 42b are immediately contracted, and a load is hardly applied to the panel portion Wp. In addition, the connection portion 41c is already in close contact with the negative pressure connection portion 21, the connection portion 42c is already in close contact with the mouthpiece portion 13, and thus the flow path P1 is secured inside the communication member 40, and the negative pressure is applied to the suction portion 12 through the flow path P1 between the mouthpiece portion 13 and the negative pressure connection portion 21. Accordingly, the panel portion Wp is instantaneously held by the suction portion 12.

According to the holding nozzle 1B configured as described above, the following effects are exerted in addition to the effects obtained by the holding nozzle 1. That is, the connection portions 41c and 42c formed on both ends of the communication member 40 are always in contact with the mouthpiece portion 13 and the negative pressure connection portion 21, the panel portion Wp is instantly held to the suction portion 12 with suction, and thus a load is hardly applied to the panel portion Wp. Accordingly, it is possible to maintain quality of the panel portion Wp.

Second Embodiment

Figure 9:
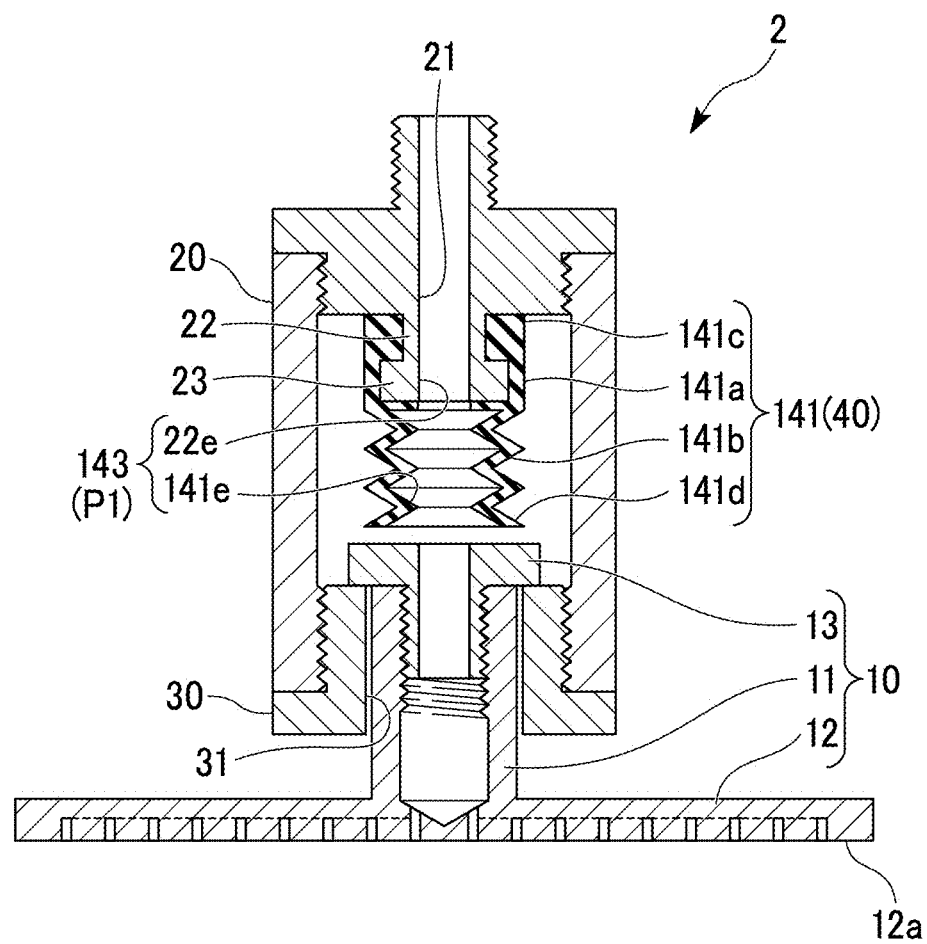
FIG. 9 is a view showing a second embodiment of the holding nozzle of the present invention and is a sectional view in a longitudinal direction of a holding nozzle 2.

As shown in FIG. 9, in a holding nozzle 2 as a second embodiment of the present invention, a shape of a communication member is different from that of the first embodiment. That is, a communication member 40 of the holding nozzle 2 is accommodated in an accommodation portion 20 between a negative pressure connection portion 21 and a mouthpiece portion 13 of a suction member 10 and includes an elastomeric bellows pad portion 141 in which an inner hole is formed in a longitudinal direction, and a hollow portion 143, which constitutes a portion of a flow path P1 through which a fluid is moved by an operation of a vacuum pump, is formed inside the bellows pad portion 141.

The bellows pad portion 141 includes a cylindrical base end portion (first connection portion) 141a, a bellows-shaped elastically contractible portion 141b which is integrally molded to the base end portion 141a, a connection portion (first coupling portion) 141c which is connected to the negative pressure connection portion 21 on a tip end of the base end portion 141a, and a connection portion (second connection portion) 141d which is connected to the mouthpiece portion 13 on a tip end of the contractible portion 141b. In addition, the bellows pad portion 141 is formed of the same material as those of the bellows pad portions 41 and 42 in the first embodiment. Meanwhile, a tubular portion (accommodation connection portion) 22 which protrudes from the negative pressure connection portion 21 toward the mouthpiece portion 13 is formed inside the accommodation portion 20. A flange portion 23 is formed at a tip end of the tubular portion 22 so as to prevent the bellows pad portion 141 from being detached from the tubular portion 22.

The base end portion 141a of the bellows pad portion 141 is attached to the tubular portion 22 of the accommodation portion 20 so as to accommodate the flange portion 23 inside the base end portion 141a. An inner hole 141e of the bellows pad portion 141 communicates with the negative pressure connection portion 21 through the inner hole 22a of the tubular portion 22, and these series of inner holes form the hollow portion 143 and form the flow path P1 between the mouthpiece portion 13 and the negative pressure connection portion 21.

In the present embodiment, when the suction portion 12 is positioned at the position separated from the accommodation portion 20, the mouthpiece portion 13 is positioned at a position separated from the negative pressure connection portion 21, and thus a distance between the mouthpiece portion 13 and the negative pressure connection portion 21 is longer than the length of the bellows pad portion 141. Accordingly, the connection portion 141d of the bellows pad portion 141 is separated from the mouthpiece portion 13, and thus a gap is generated. Meanwhile, when the suction portion 12 is positioned at a position close to the accommodation portion 20, the mouthpiece portion 13 is positioned at a position close to the negative pressure connection portion 21, and thus the distance between the mouthpiece portion 13 and the negative pressure connection portion 21 is shorter than the length of the bellows pad portion 141. Accordingly, if the suction portion 12 is moved rearward, the connection portion 141d of the bellows pad portion 141 comes into close contact with the mouthpiece portion 13. In addition, in the present embodiment, the bellows pad portion 141 is attached to the tubular portion 22, and thus the guide member 45 for maintaining the bellows pad portion 141 on the axis of the accommodation portion 20 is unnecessary.

In order to attach the holding nozzle 2 configured as described above to the nozzle support member (101) instead of the holding nozzle 1 and to hold a panel portion Wp by the holding nozzle 2, first, the holding nozzle 2 is positioned above the supply section on which the panel portion Wp is placed, and thus the flat surface portion 12a of the suction portion 12 and the absorbed surface of the panel portion Wp are separated from each other to face each other. At this time, the suction portion 12 is positioned to be moved forward with respect to the accommodation portion 20 by the weight of the suction portion 12 itself, and the connection portion 141d of the bellows pad portion 141 is separated from the mouthpiece portion 13. In this state, even when a negative pressure is applied to the holding nozzle 2 through the flow path (P2) of the nozzle support member, outside air is suctioned into the holding nozzle 2 through a gap between the connection portion 141d and the mouthpiece portion 13, an internal space of the accommodation portion 20, and a gap between a hole 31 and a shaft portion 11, and thus the negative pressure is hardly applied to the suction portion 12. However, the outside air is suctioned through the gap between the hole 31 and the shaft portion 11, and thus the suction of dust generated inside the holding nozzle 2 and the dust removal around the nozzle are performed.

From this state, the holding nozzle 2 is lowered together with the nozzle support member 101 toward a preset stop position of the holding nozzle 2, and in a process of a lowering operation of the holding nozzle 2, the flat surface portion 12a of the suction portion 12 and a suctioned surface of the panel portion Wp are close to each other to come in to close contact with each other. At this time, the suction mechanism 120 is operated together with the lowering operation of the holding nozzle 2, and thus a negative pressure is generated. The suction member 10 including the suction portion 12 is supported by the suction member support portion 30 so as to be allowed to move with respect to the suction member support portion 30, a downward force lowering the holding nozzle 2 is absorbed by the movement of the suction member 10, and thus the downward force is not applied to the panel portion Wp. Only the weight of the suction member 10 including the suction portion 12 is applied to the panel portion Wp.

Even after the suction portion 12 comes into contact with an upper surface of the panel portion Wp, if the lowering of the holding nozzle 2 is continued and the holding nozzle 2 is moved to the preset stop position of the holding nozzle 2, the movement of the suction portion 12 moved downward together with the holding nozzle 2 is restricted by the panel portion Wp. After that, if the holding nozzle 2 and the suction portion 12 are further moved downward, the suction member 10 cannot be moved. However, the nozzle support member 101, the accommodation portion 20, and the suction member support portion 30 are moved downward. Accordingly, the suction member support portion 30 is moved downward along the shaft portion 11 of the suction member 10, substantially the shaft portion 11 and the mouthpiece portion 13 enter the accommodation portion 20. Therefore, a distance between the connection portion 141*d* of the bellows pad portion 141 and the mouthpiece portion 13 is reduced, and thus the mouthpiece portion 13 is brought into contact with the connection portion 141*d*. If the holding nozzle 2 is further moved downward, the connection portion 141*d* is pressed onto the mouthpiece portion 13. As a result, the connection portion 141*d* and the mouthpiece portion 13 come into close contact with each other, and thus the flow path P1 is formed, in which a negative pressure is applied to the suction portion 12 between the mouthpiece portion 13 and the negative pressure connection portion 21 inside the communication member 40. Accordingly, the panel portion Wp is held by the suction portion 12.

According to the holding nozzle 2 configured as described above, the following effects are exerted in addition to the effects obtained by the modification example (holding nozzle 1A) of the first embodiment. That is, the number of parts of the communication member 40 is reduced, the holding nozzle 2 itself can be manufactured small, and a manufacturing cost can be reduced. In addition, the holding nozzle 2 can be machined to be small and lightweight, and operability of a movement unit (210) for moving the holding nozzle 2 is improved.

Third Embodiment

Figure 10:
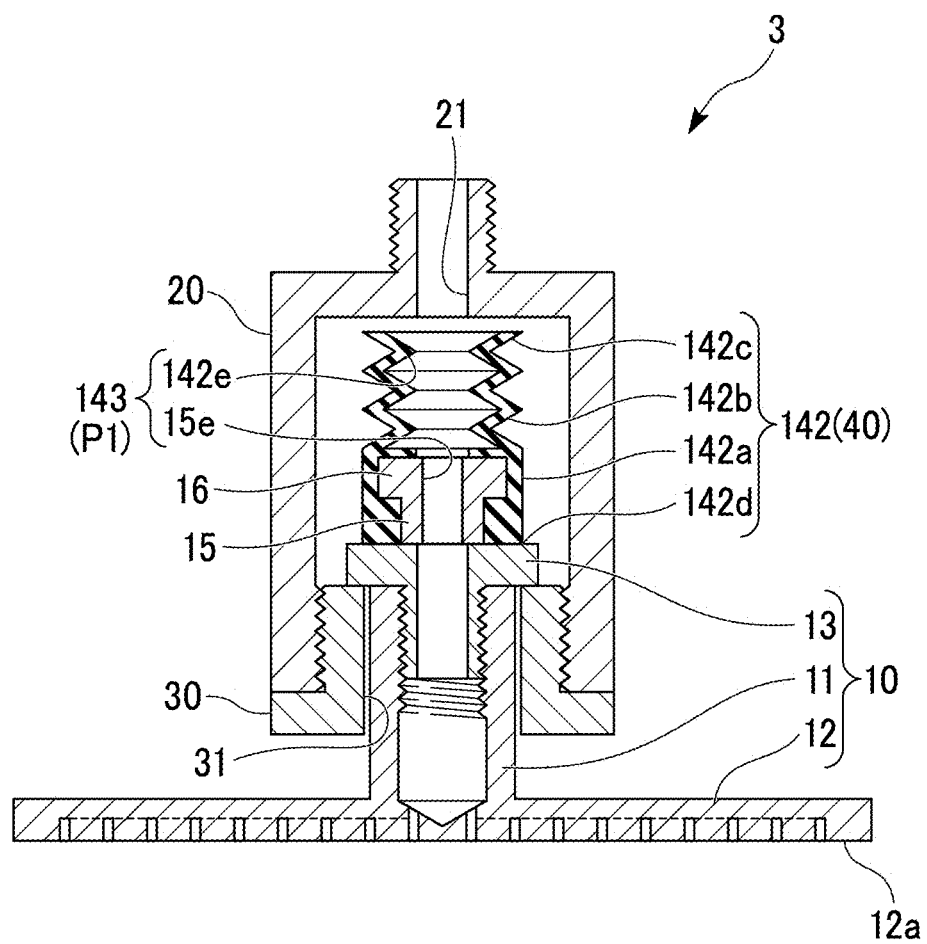
FIG. 10 is a view showing a third embodiment of the holding nozzle of the present invention and is a sectional view in a longitudinal direction of a holding nozzle 3.

As shown in FIG. 10, in a holding nozzle 3 as a third embodiment of the present invention, a disposition of a communication member is different from that of the second embodiment. That is, a communication member 40 of the holding nozzle 3 is accommodated in an accommodation portion 20 between a negative pressure connection portion 21 and a mouthpiece portion 13 of a suction member 10 and includes an elastomeric bellows pad portion 142 in which an inner hole is formed in a longitudinal direction, and a hollow portion 143, which constitutes a portion of a flow path P1 through which a fluid is moved by an operation of a vacuum pump, is formed inside the bellows pad portion 142.

The bellows pad portion 142 includes a cylindrical base end portion (first coupling portion) 142*a*, a bellows-shaped elastically contractible portion 142*b* which is integrally molded to the base end portion 142*a*, a connection portion (first connection portion) 142*c* which is connected to the negative pressure connection portion 21 on a tip end of the contractible portion 142*b*, and a connection portion (second connection portion) 142*d* which is connected to the mouthpiece portion 13 on a tip end of the base end portion 142*a*. In addition, the bellows pad portion 142 is formed of the same material as those of the bellows pad portions 41 and 42 in the first embodiment. Meanwhile, a tubular portion (suction connection portion) 15 which protrudes toward the negative pressure connection portion 21 is formed above the mouthpiece portion 13. A flange portion 16 is formed at a tip end of the tubular portion 15 so as to prevent the bellows pad portion 142 from being detached from the tubular portion 15.

The base end portion 142*a* of the bellows pad portion 142 is attached to the tubular portion 15 of the mouthpiece portion 13 so as to accommodate the flange portion 16 inside the base end portion 142*a*. An inner hole 142*e* of the bellows pad portion 142 communicates with the mouthpiece portion 13 through the inner hole 15*a* of the tubular portion 15, and these series of inner holes form the hollow portion 143 and form the flow path P1 between the mouthpiece portion 13 and the negative pressure connection portion 21.

In the present embodiment, when the suction portion 12 is positioned at the position separated from the accommodation portion 20, the mouthpiece portion 13 is positioned at a position separated from the negative pressure connection portion 21, and thus a distance between the mouthpiece portion 13 and the negative pressure connection portion 21 is longer than the length of the bellows pad portion 142. Meanwhile, when the suction portion 12 is positioned at a position close to the accommodation portion 20, the mouthpiece portion 13 is positioned at a position close to the negative pressure connection portion 21, and thus the distance between the mouthpiece portion 13 and the negative pressure connection portion 21 is shorter than the length of the bellows pad portion 142. Accordingly, if the suction portion 12 is moved rearward, the connection portion 142*c* of the bellows pad portion 142 comes into close contact with the negative pressure connection portion 21. In addition, in the present embodiment, the bellows pad portion 142 is attached to the mouthpiece portion 13, and thus the guide member 45 for maintaining the bellows pad portion 142 on the axis of the accommodation portion 20 is unnecessary.

In order to attach the holding nozzle 3 configured as described above to the nozzle support member (101) instead of the holding nozzle 1 and to hold a panel portion Wp by the holding nozzle 3, first, the holding nozzle 3 is positioned above the supply section on which the panel portion Wp is placed, and thus the flat surface portion 12*a* of the suction portion 12 and the absorbed surface of the panel portion Wp are separated from each other to face each other. At this time, the suction portion 12 is positioned to be moved forward with respect to the accommodation portion 20 by the weight of the suction portion 12 itself (that is, the suction portion is lowered with respect to the accommodation portion 20), and the connection portion 142*c* of the bellows pad portion 142 is separated from the negative pressure connection portion 21. In this state, even when a negative pressure is applied to the holding nozzle 3 through the flow path (P2) of the nozzle support member, outside air is suctioned into the holding nozzle 3 through a gap between the connection portion 142*c* and the negative pressure connection portion 21, an internal space of the accommodation portion 20, and a gap between a hole 31 and a shaft portion 11, and thus the negative pressure is hardly applied to the suction portion 12. However, the outside air is suctioned through the gap between the hole 31 and the shaft portion 11, and thus the suction of dust generated inside the holding nozzle 3 and the dust removal around the nozzle are performed.

From this state, the holding nozzle 3 is lowered together with the nozzle support member 101 toward a preset stop position of the holding nozzle 3, and in a process of a lowering operation of the holding nozzle 3, the flat surface portion 12*a* of the suction portion 12 and a suctioned surface of the panel portion Wp are close to each other to come in to close contact with each other. At this time, the suction mechanism 120 is operated together with the lowering operation of the holding nozzle 3, and thus a negative pressure is generated. The suction member 10 including the suction portion 12 is supported by the suction member support portion 30 so as to be allowed to move with respect to the suction member support portion 30, a downward force lowering the holding nozzle 3 is absorbed by the movement of the suction member 10, and thus the downward force is not applied to the panel portion Wp. Only the weight of the suction member 10 including the suction portion 12 is applied to the panel portion Wp.

Even after the suction portion 12 comes into contact with an upper surface of the panel portion Wp, if the lowering of the holding nozzle 3 is continued and the holding nozzle 3 is moved to the preset stop position of the holding nozzle 3, the movement of the suction portion 12 moved downward together with the holding nozzle 3 is restricted by the panel portion Wp. After that, if the holding nozzle 3 and the suction portion 12 are further moved downward, the suction member 10 cannot be moved. However, the nozzle support member 101, the accommodation portion 20, and the suction member support portion 30 are moved downward. Accordingly, the suction member support portion 30 is moved downward along the shaft portion 11 of the suction member 10, substantially the shaft portion 11 and the mouthpiece portion 13 enter the accommodation portion 20. Therefore, a distance between the connection portion 142c of the bellows pad portion 142 and the negative pressure connection portion 21 is reduced, and thus the negative pressure connection portion 21 is brought into contact with the connection portion 142c. If the holding nozzle 3 is further moved downward, the connection portion 142c is pressed onto the negative pressure connection portion 21. As a result, the connection portion 142c and the negative pressure connection portion 21 come into close contact with each other, and thus the flow path P1 is formed, in which a negative pressure is applied to the suction portion 12 between the mouthpiece portion 13 and the negative pressure connection portion 21 inside the communication member 40. Accordingly, the panel portion Wp is held by the suction portion 12.

According to the holding nozzle 3 configured as described above, the same effects (holding nozzle 2) as those of the second embodiment are exerted in addition to the effects obtained by the first embodiment (holding nozzle 1). That is, the number of parts of the communication member 40 is reduced, the holding nozzle 3 itself can be manufactured small, and a manufacturing cost can be reduced. In addition, the holding nozzle 3 can be machined to be small and lightweight, and operability of a movement unit (210) for moving the holding nozzle 3 is improved.

Fourth Embodiment

Figure 11:
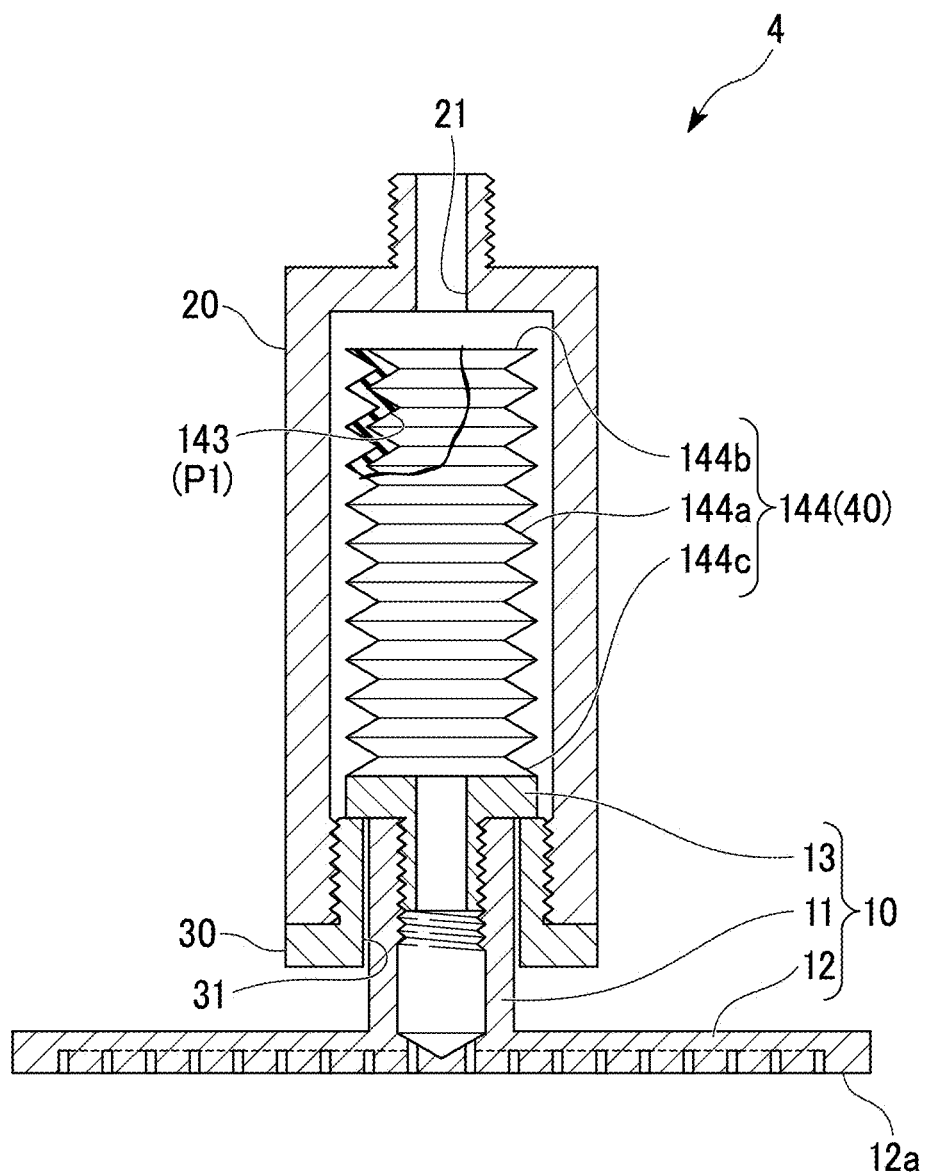
FIG. 11 is a view showing a fourth embodiment of the holding nozzle of the present invention and is a sectional view in a longitudinal direction of a holding nozzle 4.

As shown in FIG. 11, in a holding nozzle 4 as a second embodiment of the present invention, a shape of a communication member is different from that of any one of the first to third embodiments. That is, a communication member 40 of the holding nozzle 4 includes a bellows portion 144, and a hollow portion 143, which constitutes a portion of a flow path P1 through which a fluid is moved by an operation of a vacuum pump, is formed inside the bellows portion 144.

The bellows portion 144 includes an elastically contractible portion 144a in the form of a bellows in the entire longitudinal direction, a connection portion (first connection portion) 144b which is connected to the negative pressure connection portion 21 on one end of the contractible portion 144a, and a connection portion (second connection portion) 144c which is connected to the mouthpiece portion 13 on the other end of the contractible portion 144a. The bellows portion 144 is not coupled to the negative pressure connection portion 21 nor to the mouthpiece portion 13 and is positioned inside the accommodation portion 20 such that a longitudinal direction of the bellows portion 144 coincides with the accommodation portion 20, and the connection portion 144c is brought into contact with the mouthpiece portion 13 due to the weight of the connection portion 144c itself. In addition, an outer diameter of the bellows portion 144 is set to be slightly smaller than an inner circumferential diameter of the accommodation portion 20, and thus the bellows portion 144 is accommodated in the accommodation portion 20 such that an axis of the accommodation portion 20 and an axis of the bellows portion 144 substantially coincide with each other without the guide member 45.

In the present embodiment, when the suction portion 12 is positioned at a position separated from the accommodation portion 20, the mouthpiece portion 13 is positioned at a position separated from the negative pressure connection portion 21, and thus a distance between the mouthpiece portion 13 and the negative pressure connection portion 21 is longer than the length of the bellows portion 144. Meanwhile, when the suction portion 12 is positioned at a position close to the accommodation portion 20, the mouthpiece portion 13 is positioned at a position close to the negative pressure connection portion 21, and thus the distance between the mouthpiece portion 13 and the negative pressure connection portion 21 is shorter than the length of the bellows portion 144. Accordingly, if the suction portion 12 is moved rearward, the connection portion 144b of the bellows portion 144 comes into close contact with the negative pressure connection portion 21.

In order to attach the holding nozzle 4 configured as described above to the nozzle support member (101) instead of the holding nozzle 1 and to hold a panel portion Wp by the holding nozzle 4, first, the holding nozzle 4 is positioned above the supply section on which the panel portion Wp is placed, and thus the flat surface portion 12a of the suction portion 12 and the absorbed surface of the panel portion Wp are separated from each other to face each other. At this time, the suction portion 12 is positioned to be moved forward with respect to the accommodation portion 20 by the weight of the suction portion 12 itself (that is, the suction portion 12 is lowered with respect to the accommodation portion 20), and the connection portion 144b of the bellows portion 144 is separated from the negative pressure connection portion 21. In this state, even when a negative pressure is applied to the holding nozzle 4 through the flow path (P2) of the nozzle support member, outside air is suctioned into the holding nozzle 4 through a gap between the connection portion 144b and the negative pressure connection portion 21, an internal space of the accommodation portion 20, and a gap between a hole 31 and a shaft portion 11, and thus the negative pressure is hardly applied to the suction portion 12. However, the outside air is suctioned through the gap between the hole 31 and the shaft portion 11, and thus the suction of dust generated inside the holding nozzle 4 and the dust removal around the nozzle are performed.

From this state, the holding nozzle 4 is lowered together with the nozzle support member toward a preset stop position of the holding nozzle 4, and in a process of a lowering operation of the holding nozzle 4, the flat surface portion 12a of the suction portion 12 and a suctioned surface of the panel portion Wp are close to each other to come in to close contact with each other. At this time, the suction mechanism 120 is operated together with the lowering operation of the holding nozzle 4, and thus a negative pressure is generated. The suction member 10 including the suction portion 12 is supported by the suction member support portion 30 so as to be allowed to move with respect to the suction member support portion 30, a downward force lowering the holding nozzle 4 is absorbed by the movement of the suction member 10, and thus the downward force is not applied to the panel portion Wp. Only the combined weight of the suction member 10 including the suction portion 12 and the bellows portion 144 is applied to the panel portion Wp.

Even after the suction portion 12 comes into contact with an upper surface of the panel portion Wp, if the lowering of the holding nozzle 4 is continued and the holding nozzle 4 is moved to the preset stop position of the holding nozzle 4, the movement of the suction portion 12 moved downward together with the holding nozzle 4 is restricted by the panel portion Wp. After that, if the holding nozzle 4 and the suction portion 12 are further moved downward, the suction member 10 cannot be moved. However, the nozzle support member 101, the accommodation portion 20, and the suction member support portion 30 are moved downward. Accordingly, the suction member support portion 30 is moved downward along the shaft portion 11 of the suction member 10, substantially the shaft portion 11 and the mouthpiece portion 13 enter the accommodation portion 20. Therefore, a distance between the connection portion 144b of the bellows portion 144 and the negative pressure connection portion 21 is reduced, and thus the negative pressure connection portion 21 is brought into contact with the connection portion 144b. If the holding nozzle 4 is further moved downward, the negative pressure connection portion 21 is pressed onto the connection portion 144b of the bellows portion 144. As a result, the connection portion 144b and the negative pressure connection portion 21 come into close contact with each other, and thus the flow path P1 is formed, in which a negative pressure is applied to the suction portion 12 between the mouthpiece portion 13 and the negative pressure connection portion 21 inside the communication member 40. Accordingly, the panel portion Wp is held by the suction portion 12.

According to the holding nozzle 4 configured as described above, the following effects are exerted in addition to the effects obtained by the first embodiment (holding nozzle 1). That is, the number of parts of the communication member 40 is reduced. In addition, the length of the bellows portion 144 is the same as the contractible portion 144a, and thus the total length of the contractible portion 144a can be a minimum necessary size, and the holding nozzle 4 itself can be manufactured smaller. Accordingly, a manufacturing cost can be reduced. In addition, the holding nozzle 4 can be machined to be small and lightweight, and operability of a movement unit (210) for moving the holding nozzle 4 is improved.

Modification Example 3

Figure 12:
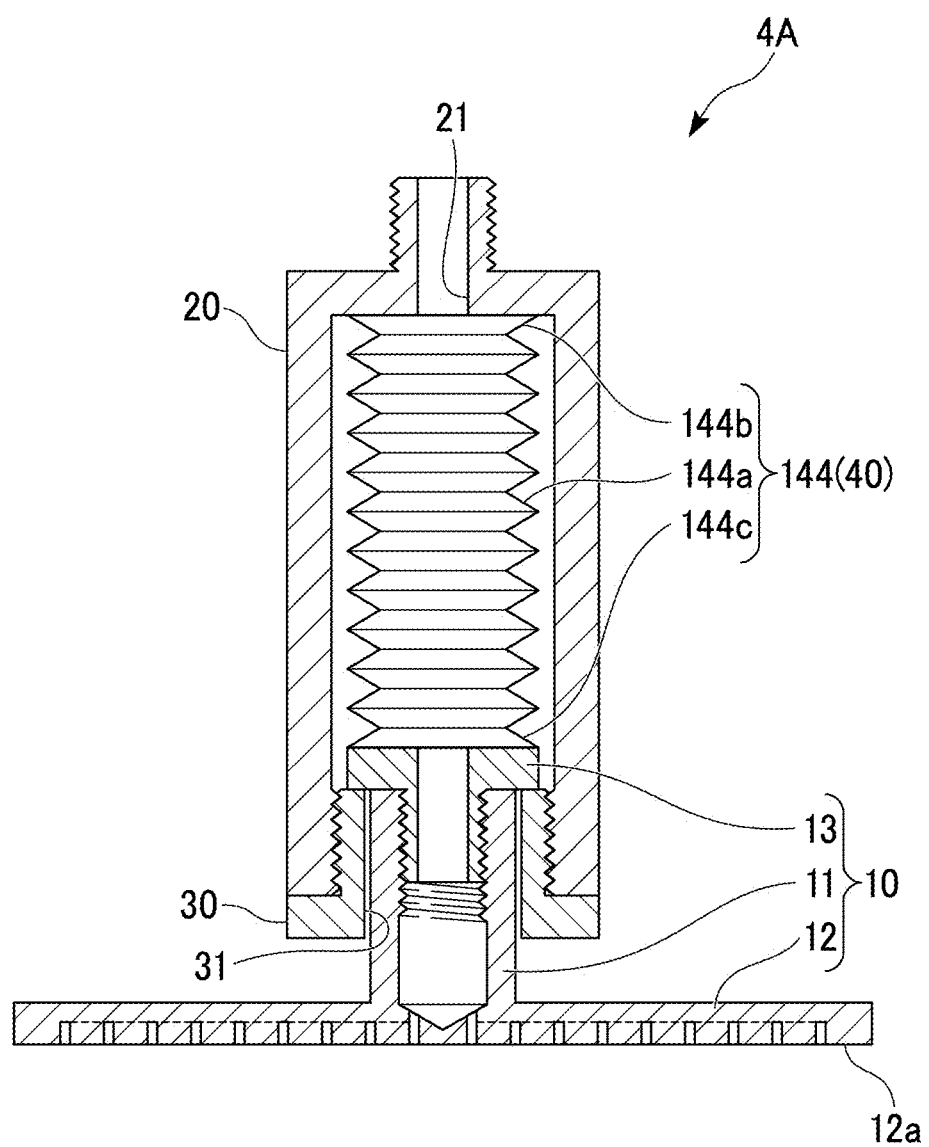
FIG. 12 is a view showing a modification example of the fourth embodiment and is a sectional view in a longitudinal direction of a holding nozzle 4A.

As shown in FIG. 12, in a holding nozzle 4A as a modification example of the first embodiment, a length of a bellows portion 144 constituting the communication member 40 is approximately the same as the distance between the mouthpiece portion 13 and the negative pressure connection portion 21 when the suction portion 12 is moved forward with respect to the accommodation portion 20 and the mouthpiece portion 13 is positioned at the position separated from the negative pressure connection portion 21. Accordingly, even when the mouthpiece portion 13 is positioned at the position separated from the negative pressure connection portion 21, the connection portion 144b is brought into contact with the negative pressure connection portion 21 and the connection portion 144c is brought into contact with the mouthpiece portion 13.

In order to attach the holding nozzle 4A configured as described above to the nozzle support member (101) instead of the holding nozzle 1 so as to hold the panel portion Wp with suction, first, the holding nozzle 4A is positioned above the supply section on which the panel portion Wp is placed, and thus the flat surface portion 12a of the suction portion 12 and the absorbed surface of the panel portion Wp are separated from each other to face each other. At this time, the suction portion 12 is moved forward with respect to the accommodation portion 20 and the mouthpiece portion 13 is positioned at the position separated from the negative pressure connection portion 21. However, even in this state, in the holding nozzle 4A, the connection portion 144b is brought into contact with the negative pressure connection portion 21 and the connection portion 144c is brought into contact with the mouthpiece portion 13.

From this state, the holding nozzle 4A is lowered together with the nozzle support member, the suction mechanism 120 is operated, and thus a negative pressure is generated. In this process, the suction portion 12 is brought into contact with the suctioned surface of the panel portion Wp. However, the suction member 10 including the suction portion 12 is supported by the suction member support portion 30 to be allowed to move with respect to the suction member support portion 30. Accordingly, even when the downward force lowering the holding nozzle 4A is applied to the panel portion Wp via the suction member 10, the contractible portion 144a is immediately contracted, and a load is hardly applied to the panel portion Wp. In addition, the connection portion 144b is already in close contact with the negative pressure connection portion 21, the connection portion 144c is already in close contact with the mouthpiece portion 13, and thus the flow path P1 is secured inside the bellows portion 144, and the negative pressure is applied to the suction portion 12 through the flow path P1 between the mouthpiece portion 13 and the negative pressure connection portion 21. Accordingly, the panel portion Wp is instantaneously held by the suction portion 12.

According to the holding nozzle 4A configured as described above, the following effects are exerted in addition to the effects obtained by the holding nozzle 4. That is, the connection portions 144b and 144c formed on both ends of the bellows portion 144 are always in contact with the mouthpiece portion 13 and the negative pressure connection portion 21, the panel portion Wp is instantly held by the suction portion 12, and thus a load is hardly applied to the panel portion Wp. Accordingly, it is possible to maintain quality of the panel portion Wp.

Fifth Embodiment

Figure 13:
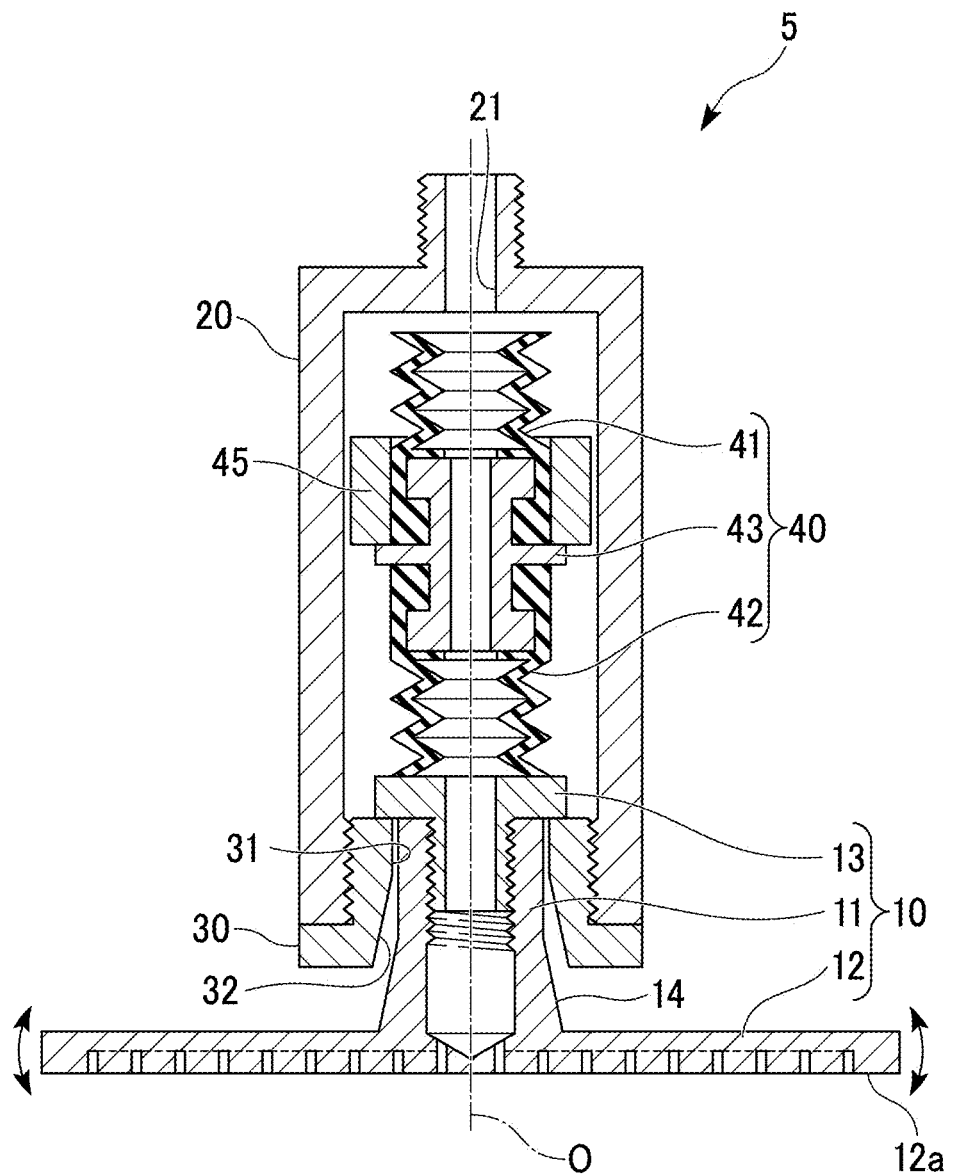
FIG. 13 is a view showing a fifth embodiment of the holding nozzle of the present invention and is a sectional view in a longitudinal direction of a holding nozzle 5.

As shown in FIG. 13, in a holding nozzle 5 as a fifth embodiment of the present invention, a slight gap is formed between an inner circumferential surface of a hole 31 and an outer circumferential surface of a shaft portion 11. Accordingly, the suction portion 12 can be tilted with respect to a suction member support portion 30 with a mouthpiece portion 13 as a supporting point. In addition, an outer diameter of the hole 31 gradually increases continuously from an approximately center of the hole 31 in a longitudinal direction toward an opening 31a on the suction portion 12 side, and a tapered funnel portion (suction guide portion) 32 is formed on the opening 31a of the hole 31. Meanwhile, an outer diameter of the shaft portion 11 gradually increases continuously from an approximately center of the shaft portion 11 in a longitudinal direction toward the suction portion 12, and a tapered diameter-increasing portion (suction guided portion) 14 is formed between the shaft portion 11 and the suction portion 12. An inclination angle of the funnel portion 32 with respect to an axis O of the accommodation portion 20 in a longitudinal direction is set to the same as an inclination angle of the diameter-increasing portion 14 with respect to the axis O. When the suction portion 12 is moved rearward with respect to the accommodation portion 20, the funnel portion 32 comes into contact with the diameter-increasing portion 14, and a direction of the suction portion 12 is changed such that a flat surface portion 12a of the suction portion 12 is perpendicular to the axis O of the accommodation portion 20 in the longitudinal direction.

In a transportation apparatus 200, in a state where a plurality of panel assemblies W are placed on a supply tray 201, the panel assemblies W are sequentially supplied below the holding head 100. However, in the panel assemblies W placed on the supply tray 201, orientations (inclinations) of the absorbed surfaces may be slightly different from each other. At this time, the flat surface portion 12a of the suction portion 12 and a suctioned surface of a panel portion Wp of the panel assembly W positioned immediately below the suction portion 12 are not parallel to each other. However, according to the holding nozzle 5 configured as described above, the suction portion 12 is allowed to tilt in all directions in a lateral direction with the mouthpiece portion 13 as a supporting point. Accordingly, if the holding nozzle 5 is lowered and the flat surface portion 12a of the suction portion 12 is brought into contact with the suctioned surface of the panel portion Wp, the suction portion 12 is tilted depending on the orientation (inclination) of the suctioned surface of the panel portion Wp, and the flat surface portion 12a of the suction portion 12 is parallel to the suctioned surface of the panel portion Wp. Therefore, the flat surface portion 12a and the panel portion Wp come into surface contact with each other such that a contact pressure is uniform, and reliable suction and holding are obtained. In addition, if the suction portion 12 which holds the panel portion Wp is moved rearward with respect to the accommodation portion 20 by a suction operation of a suction mechanism 120, the diameter-increasing portion 14 of the shaft portion 11 is guided by the funnel portion 32 of the suction member support portion 30, and the orientation of the suction portion 12 is changed such that the flat surface portion 12a is perpendicular to the axis O of the accommodation portion 20 in the longitudinal direction. Accordingly, it is possible to correct a posture of the panel assembly W, and it is possible to deliver the panel assembly W in a correct posture to the belt conveyor 202 of the destination section.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

The present invention relates to a holding nozzle for holding a workpiece with suction of air, a holding head which includes the holding nozzle, and a transportation apparatus which transports the workpiece held by the holding nozzle.

According to the present invention, distortion or a suction trace does not occur in the workpiece to be transported, and since a size of a transportation apparatus is small, operability of the holding nozzle is not impaired by the transportation apparatus.

What is claimed is:

1. A holding nozzle for holding a panel with suction, comprising:
   a suction member including a suction portion configured to come into contact with the panel and a cylindrical shaft portion which communicates with the suction portion;
   a tubular accommodation portion in which the shaft portion of the suction member is accommodated;
   a suction member support portion which is installed on a first end of the accommodation portion and configured to support the shaft portion such that the suction member is movable with respect to the accommodation portion;
   a negative pressure connection portion which is installed on a second end of the accommodation portion and to which a negative pressure generator is connected; and
   a communication member which is accommodated in the accommodation portion between the negative pressure connection portion and the suction member support portion and having a hollow portion which is a portion of a first flow path, a fluid to which a negative pressure is applied by the negative pressure generator flowing through the first flow path, wherein the communication member includes
   a first connection portion which is connected to the negative pressure connection portion,
   a second connection portion which is connected to the shaft portion, and
   a contractible portion which is installed between the first and second connection portions,
   wherein a gap is formed between the shaft portion of the suction member and the suction member support portion to allow a movement of the shaft portion with respect to the suction member support portion,
   wherein the suction member support portion includes a suction guide portion which is configured to guide the suction member holding the panel in suction while rectifying a movement of the suction member in a direction parallel to a surface of the panel, and
   wherein the suction member includes a suction guided portion which is guided by the suction guide portion.

2. The holding nozzle according to claim 1, wherein the accommodation portion includes an accommodation connection portion to which the first connection portion is coupled, and
   the first connection portion is fixed to the negative pressure connection portion via the accommodation connection portion.

3. The holding nozzle according to claim 1, wherein the shaft portion includes a suction connection portion to which the second connection portion is coupled, and
   the second connection portion is fixed to the shaft portion via the suction connection portion.

4. The holding nozzle according to claim 1, wherein the connection member further includes a first coupling portion which is continuously coupled to the contractible portion,
   the first connection portion is adjacent to the contractible portion and is installed on a first end portion of the communication member, and the second connection portion is adjacent to the first coupling portion and is installed on a second end portion of the communication member.

5. The holding nozzle according to claim 1, wherein the first connection portion is installed on a first end portion of the contractible portion and
the second connection portion is installed on a second end portion of the contractible portion.

6. The holding nozzle according to claim 1, further comprising:
a guide member which is installed around the communication member to position the communication member at a center of the accommodation portion.

7. The holding nozzle according to claim 6, wherein the guide member includes an inner circumferential portion which is capable of contacting with an outer circumference of the communication member and an outer circumferential portion which is capable of contacting with an inner circumference of the accommodation portion,
the guide member is an annular body inside which the communication member is positioned, and
the length of the guide member in a contraction direction of the communication member is shorter than that of the communication member even in a state where the communication member is contracted.

8. The holding nozzle according to claim 1, wherein the contractible portion is formed in a bellows shape.

9. A holding nozzle for holding a panel with suction, comprising:
a suction member including a suction portion configured to come into contact with the panel and a cylindrical shaft portion which communicates with the suction portion;
a tubular accommodation portion in which the shaft portion of the suction member is accommodated;
a suction member support portion which is installed on a first end of the accommodation portion and configured to support the shaft portion such that the suction member is movable with respect to the accommodation portion;
a negative pressure connection portion which is installed on a second end of the accommodation portion and to which a negative pressure generator is connected; and
a communication member which is accommodated in the accommodation portion between the negative pressure connection portion and the suction member support portion and having a hollow portion which is a portion of a first flow path, a fluid to which a negative pressure is applied by the negative pressure generator flowing through the first flow path,
wherein the communication member includes
a first connection portion which is connected to the negative pressure connection portion,
a second connection portion which is connected to the shaft portion,
a contractible portion which is installed between the first and second connection portions,
a first molded member which is provided with the first connection portion, the contractible portion, and a first coupling portion which is continuously coupled to the contractible portion, and
a second molded member which is provided with the second connection portion, the contractible portion, and a second coupling portion which is continuously coupled to the contractible portion.

10. The holding nozzle according to claim 9, wherein the communication member further includes a coupling member which is installed between the first coupling portion and the second coupling portion to couple the first molded member with the second molded member, a portion of the hollow portion being included in the coupling member.

11. A holding head for holding a panel assembly including a panel portion with suction, comprising:
a holding nozzle for holding a panel with suction; and
a nozzle support member configured to support the holding nozzle,
wherein the nozzle support member includes
a suction member including a suction portion configured to come into contact with the panel and a cylindrical shaft portion which communicates with the suction portion;
a tubular accommodation portion in which the shaft portion of the suction member is accommodated;
a suction member support portion which is installed on a first end of the accommodation portion and configured to support the shaft portion such that the suction member is movable with respect to the accommodation portion;
a negative pressure connection portion which is installed on a second end of the accommodation portion and to which a negative pressure generator is connected; and
a communication member which is accommodated in the accommodation portion between the negative pressure connection portion and the suction member support portion and having a hollow portion which is a portion of a first flow path, a fluid to which a negative pressure is applied by the negative pressure generator flowing through the first flow path,
wherein the communication member includes
a first connection portion which is connected to the negative pressure connection portion,
a second connection portion which is connected to the shaft portion, and
a contractible portion which is installed between the first and second connection portions, and
wherein the nozzle support member includes
a first nozzle connection portion to which the holding nozzle is connected, and
a second flow path which communicates with the first flow path via the first nozzle connection portion and through which the fluid flows.

12. The holding head according to claim 11, further comprising:
an accessory portion-holding nozzle configured to hold an accessory portion included in the panel assembly with suction, wherein the nozzle support member includes
a second nozzle connection portion to which the accessory portion-holding nozzle is connected, and
a second flow path which communicates with the accessory portion-holding nozzle via the second nozzle connection portion and through which the fluid flows.

13. A transportation apparatus for holding a panel assembly supplied to a supply section with suction and moving the panel assembly to a destination section, comprising:
a supply portion which is configured to supply the panel assembly to a predetermined position;
the holding head according to claim 11 which is configured to hold the panel assembly supplied to the predetermined position with suction;
a movement unit which is configured to move the holding head; and
a control unit which is configured to control a holding operation of the panel assembly performed by the holding head and a movement operation of the holding head performed by the movement unit.

* * * * *